US012593058B2

(12) United States Patent
Skupin et al.

(10) Patent No.: US 12,593,058 B2
(45) Date of Patent: Mar. 31, 2026

(54) BITSTREAM MERGING

(71) Applicant: FRAUNHOFER-GESELLSCHAFT ZUR FÖRDERUNG DER ANGEWANDTEN FORSCHUNG E.V., Munich (DE)

(72) Inventors: Robert Skupin, Berlin (DE); Yago Sánchez De La Fuente, Berlin (DE); Cornelius Hellge, Berlin (DE); Thomas Schierl, Berlin (DE); Karsten Sühring, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/368,061

(22) Filed: Sep. 14, 2023

(65) Prior Publication Data

US 2023/0421793 A1 Dec. 28, 2023

Related U.S. Application Data

(63) Continuation of application No. 17/199,984, filed on Mar. 12, 2021, now Pat. No. 11,800,128, which is a
(Continued)

(30) Foreign Application Priority Data

Sep. 13, 2018 (EP) ..................................... 18194348

(51) Int. Cl.
*H04N 19/46* (2014.01)

(52) U.S. Cl.
CPC ..................................... *H04N 19/46* (2014.11)

(58) Field of Classification Search
None
See application file for complete search history.

(56) References Cited

U.S. PATENT DOCUMENTS 11,800,128 B2 * 10/2023 Skupin ................... H04N 19/46
2014/0240319 A1 8/2014 Syed
(Continued)

FOREIGN PATENT DOCUMENTS

EP 3349467 7/2018
JP 2012-231295 11/2012
(Continued)

OTHER PUBLICATIONS

Miska M. Hannuksela, "Indication of the temporal structure of coded video sequences" JCTVC-H0423r3, San Jose, Ca, USA, Feb. 1-10, 2012, 5 pages.
(Continued)

*Primary Examiner* — Kaitlin A Retallick
(74) *Attorney, Agent, or Firm* — Sage Patent Group

(57) ABSTRACT

A video encoder for providing an encoded video representation. The video encoder provides a level information that indicates a compatibility of a video stream with a video decoder having a capability level out of a plurality of predetermined capability levels as well as a fractional level information that indicates a fraction of one of the plurality of predetermined capability levels. A video decoder for decoding a provided video representation receives level information and fractional level information.

20 Claims, 23 Drawing Sheets

Related U.S. Application Data continuation of application No. PCT/EP2019/074436, filed on Sep. 12, 2019.

(56)                References Cited

U.S. PATENT DOCUMENTS

| | | | | |
|---|---|---|---|---|
| 2015/0256856 | A1* | 9/2015 | Tsukuba | H04N 19/44 375/240.25 |
| 2015/0264373 | A1* | 9/2015 | Wang | H04N 19/44 375/240.25 |
| 2020/0351497 | A1 | 11/2020 | Skupin | |
| 2021/0021814 | A1* | 1/2021 | Wang | H04N 19/132 |
| 2021/0021849 | A1* | 1/2021 | Wang | H04N 19/70 |
| 2022/0014759 | A1 | 1/2022 | Narasimhan | |

FOREIGN PATENT DOCUMENTS

| | | |
|---|---|---|
| KR | 10-2005-0012809 | 2/2005 |
| WO | 03/107678 | 12/2003 |

OTHER PUBLICATIONS

Y. Wu et al, "Motion-constrained tile sets SEI message" JCTVC-M0235, Incheon, KR, Apr. 18-26, 2013, 4 pages.

Y. Sanchez et al, "Low complexity cloud-video-mixing using HEVC" 2014 IEEE 11$^{th}$ Consumer Communications and Networking Conference (CCNC), IEEE, Jan. 10, 2014 (Jan. 10, 2014) pp. 213-218, XP032626067, DOI: 10.1109/CCNC.2014.6866573, 6 p.

Robert Skupin et al, "Compressed domain video compositing with HEVC" Picture Coding Symposium (PCS), 2015, IEEE, 2015, 5 pages.

ISO/IEC FDIS 23090-2, Information technology—Coded representation of immersion media—Part 2: Omnidirectional media format, MPEG OMAF, 2018, 182 pages.

Y-K Wang et al, "[OMAF] Constraints on sub-picture tracks and sub-picture bitstreams" 122. MPEG Meeting; Apr. 16, 2018-Apr. 20, 2018, San Diego; (Motion Picture Expert Group or ISO/IEC JTC1/SC29/WG11), No. m42458, Apr. 7, 2018 (Apr. 7, 2018), XP030070797, 3 pages.

Y-K Wang et al, "On lightweight bitstream merging" 31. JCT-VC Meeting; Apr. 14, 2018-Apr. 20, 2018; San Diego; (Joint Collaborative Team On Video Coding of ISO/I EC JTC1/SC29/WG11 and ITU-T SG.16); URL: http://wftp3.itu.int/av-arch/jctvc-site/, No. JCTVC-AE0025-v2, Apr. 6, 2018 (Apr. 6, 2018), XP030118367, 4 pages.

R. Skupin et al, "AHG17: On merging of bitstreams and conformance" 15 JVET Meeting; Jul. 3, 2019-Jul. 12, 2019; Gothenburg; (The Joint Video Exploration Team of ISO/IEC JTC1/SC29/WG11 and ITU-T SG.16) No. JVET-O0492, Jun. 26, 2019 (Jun. 26, 2019), XP030219727, Retrieved from http://phenix.int-evry.fr/vet/doc_end_user/documents/15Gothenburg/sg11/JVET-O0492-v1.zip.JVET-O0492.docx, 5 pages.

ITU-T H.266, Series H: Audiovisual and Multimedia Systems, Infrastructure of audiovisual services—Coding of moving video, Versatile Video Coding, Aug. 2020, 516 pages.

H. Schwarz et al, "Overview of the Scalable Video Coding Extension of the H.264/AVC Standard" IEEE Transactions on Circuits and Systems for Video Technology, vol. 17, No. 9, Sep. 2007, pp. 1103-1120.

Motion Picture Expert Group of ISO/IEC JTC1/SC29/WG11, "WD of ISO/IEC 23090-2 OMAF 2$^{nd}$ edition," Apr. 2018, San Diego, US, 191 pages.

* cited by examiner

Figure 4A:
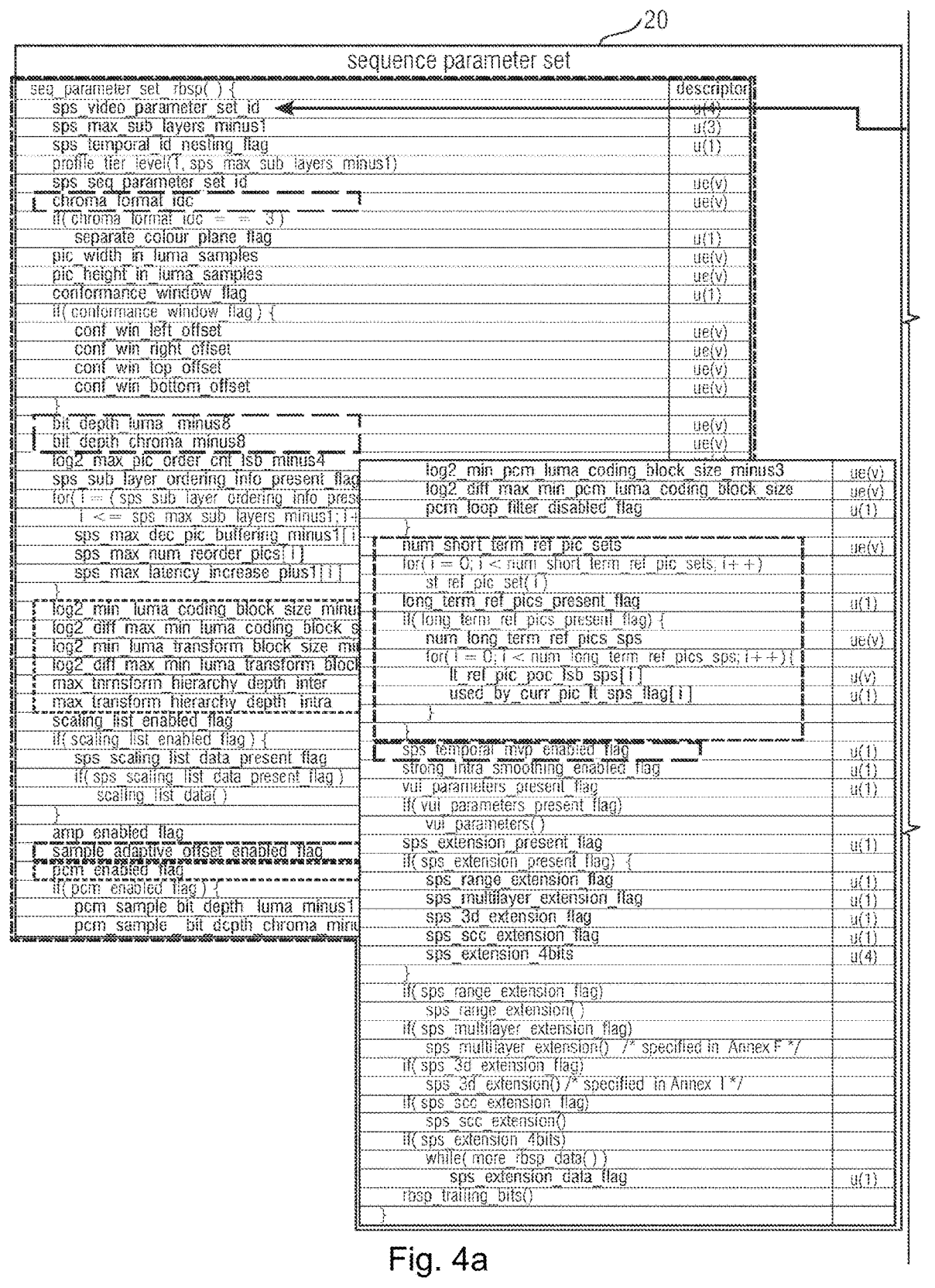

_20

| sequence parameter set | |
| --- | --- |
| seq_parameter_set_rbsp( ) { | descriptor |
| sps_video_parameter_set_id | u(4) |
| sps_max_sub_layers_minus1 | u(3) |
| sps_temporal_id_nesting_flag | u(1) |
| profile_tier_level(1, sps_max_sub_layers_minus1) | |
| sps_seq_parameter_set_id | ue(v) |
| chroma_format_idc | ue(v) |
| if( chroma_format_idc  = =  3 ) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | |
| sps_sub_layer_ordering_info_present_flag | |
| for( i = ( sps_sub_layer_ordering_info_pres | |
| i <= sps_max_sub_layers_minus1; i | |
| sps_max_dec_pic_buffering_minus1[ i | |
| sps_max_num_reorder_pics[ i ] | |
| sps_max_latency_increase_plus1[ i ] | |
| } | |
| log2_min_luma_coding_block_size_minu | |
| log2_diff_max_min_luma_coding_block_s | |
| log2_min_luma_transform_block_size_mi | |
| log2_diff_max_min_luma_transform_block | |
| max_transform_hierarchy_depth_inter | |
| max_transform_hierarchy_depth_intra | |
| scaling_list_enabled_flag | |
| if( scaling_list_enabled_flag ) { | |
| sps_scaling_list_data_present_flag | |
| if( sps_scaling_list_data_present_flag ) | |
| scaling_list_data( ) | |
| } | |
| amp_enabled_flag | |
| sample_adaptive_offset_enabled_flag | |
| pcm_enabled_flag | |
| if( pcm_enabled_flag ) { | |
| pcm_sample_bit_depth_luma_minus1 | |
| pcm_sample_bit_depth_chroma_min | |

| | |
| --- | --- |
| log2_min_pcm_luma_coding_block_size_minus3 | ue(v) |
| log2_diff_max_min_pcm_luma_coding_block_size | ue(v) |
| pcm_loop_filter_disabled_flag | u(1) |
| } | |
| num_short_term_ref_pic_sets | ue(v) |
| for( i = 0; i < num_short_term_ref_pic_sets; i++ ) | |
| st_ref_pic_set( i ) | |
| long_term_ref_pics_present_flag | u(1) |
| if( long_term_ref_pics_present_flag ) { | |
| num_long_term_ref_pics_sps | ue(v) |
| for( i = 0; i < num_long_term_ref_pics_sps; i++ ) { | |
| lt_ref_pic_poc_lsb_sps[ i ] | u(v) |
| used_by_curr_pic_lt_sps_flag[ i ] | u(1) |
| } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag ) | |
| vui_parameters( ) | |
| sps_extension_present_flag | u(1) |
| if( sps_extension_present_flag ) { | |
| sps_range_extension_flag | u(1) |
| sps_multilayer_extension_flag | u(1) |
| sps_3d_extension_flag | u(1) |
| sps_scc_extension_flag | u(1) |
| sps_extension_4bits | u(4) |
| } | |
| if( sps_range_extension_flag ) | |
| sps_range_extension( ) | |
| if( sps_multilayer_extension_flag ) | |
| sps_multilayer_extension( )  /* specified in Annex F */ | |
| if( sps_3d_extension_flag ) | |
| sps_3d_extension( ) /* specified in Annex I */ | |
| if( sps_scc_extension_flag ) | |
| sps_scc_extension( ) | |
| if( sps_extension_4bits ) | |
| while( more_rbsp_data( ) ) | |
| sps_extension_data_flag | u(1) |
| rbsp_trailing_bits( ) | |
| } | |

| picture parameter set | |
| --- | --- |
| pic_parameter_set_rbsp( ) { | descriptor |
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| | |
| num_ref_idx_l0_default_active_minus1 | ue(v) |
| num_ref_idx_l1_default_active_minus1 | ue(v) |
| init_qp_minus26 | se(v) |
| constrained_intra_pred_flag | u(1) |
| transform_skip_enabled_flag | u(1) |
| cu_qp_delta_enabled_flag | u(1) |
| if( cu_qp_delta_enabled_flag ) | |
| diff_cu_qp_delta_depth | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| transquant_bypass_enabled_flag | u(1) |
| tiles_enabled_flag | u(1) |
| entropy_coding_sync_enabled_flag | u(1) |
| if( tiles_enabled_flag ) { | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1; i++ ) | |
| column_width_minus1[ i ] | ue(v) |
| for( i = 0; i < num_tile_rows_minus1; i++ ) | |
| row_height_minus1[ i ] | ue(v) |
| } | |
| loop_filter_across_tiles_enabled_flag | u(1) |
| } | |
| pps_loop_filter_across_slices_enabled_flag | u(1) |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag ) { | |
| pps_beta_offset_div2 | se(v) |
| pps_tc_offset_div2 | se(v) |
| } | |
| } | |
| pps_scaling_list_data_present_flag | |
| if( pps_scaling_list_data_present_flag ) | |
| scaling_list_data( ) | |
| lists_modification_present_flag | |
| log2_parallel_merge_level_minus2 | |
| slice_segment_header_extension_pre | |
| pps_extension_present_flag | |
| if( pps_extension_present_flag ) { | |
| pps_range_extension_flag | |
| pps_multilayer_extension_flag | |

| | |
| --- | --- |
| pps_3d_extension_flag | u(1) |
| pps_scc_extension_flag | u(1) |
| pps_extension_4bits | u(4) |
| } | |
| if( pps_range_extension_flag ) | |
| pps_range_extension( ) | |
| if( pps_multilayer_extension_flag ) | |
| pps_multilayer_extension( ) /* specified in Annex F */ | |
| if( pps_3d_extension_flag ) | |
| pps_3d_extension( ) /* specified in Annex I */ | |
| if( pps_scc_extension_flag ) | |
| pps_scc_extension( ) | |
| if( pps_extension_4bits ) | |
| while( more_rbsp_data( ) ) | |
| pps_extension_data_flag | u(1) |
| rbsp_trailing_bits() | |
| } | |

Fig. 4b

30 slice header

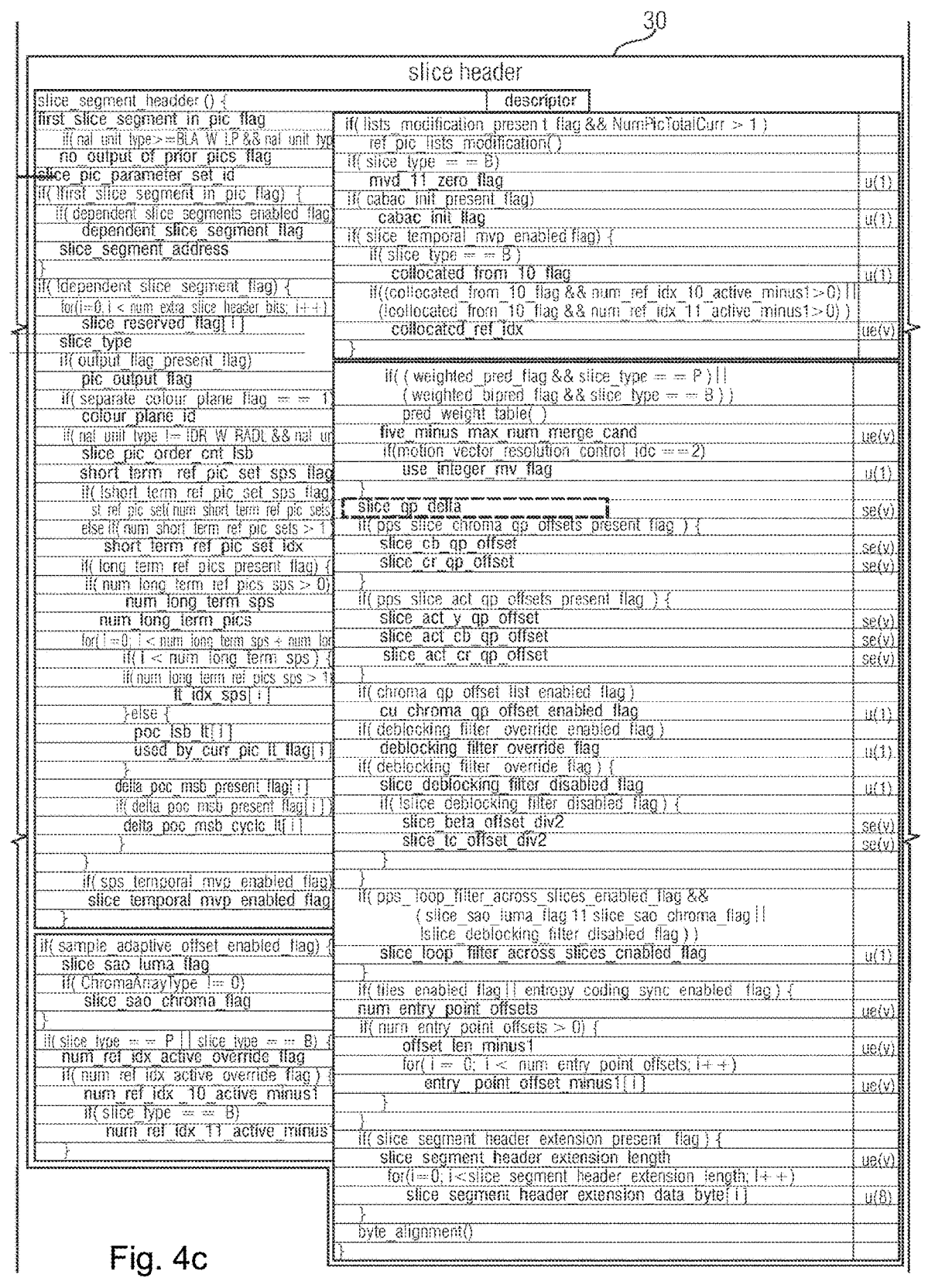

| slice_segment_header() { | descriptor |
|---|---|
| first_slice_segment_in_pic_flag | |
| if( nal_unit_type >=BLA_W_LP && nal_unit_typ | |
| no_output_of_prior_pics_flag | |
| slice_pic_parameter_set_id | |
| if( first_slice_segment_in_pic_flag ) { | |
| if( dependent_slice_segments_enabled_flag) | |
| dependent_slice_segment_flag | |
| slice_segment_address | |
| } | |
| if( !dependent_slice_segment_flag ) { | |
| for( i=0; i < num_extra_slice_header_bits; i++) | |
| slice_reserved_flag[ i ] | |
| slice_type | |
| if( output_flag_present_flag) | |
| pic_output_flag | |
| if( separate_colour_plane_flag == 1 | |
| colour_plane_id | |
| if( nal_unit_type != IDR_W_RADL && nal_un | |
| slice_pic_order_cnt_lsb | |
| short_term_ref_pic_set_sps_flag | |
| if( !short_term_ref_pic_set_sps_flag) | |
| st_ref_pic_set( num_short_term_ref_pic_sets | |
| else if( num_short_term_ref_pic_sets > 1 | |
| short_term_ref_pic_set_idx | |
| if( long_term_ref_pics_present_flag) { | |
| if( num_long_term_ref_pics_sps > 0) | |
| num_long_term_sps | |
| num_long_term_pics | |
| for( i=0; i < num_long_term_sps + num_lon | |
| if( i < num_long_term_sps ) { | |
| if( num_long_term_ref_pics_sps > 1 | |
| lt_idx_sps[ i ] | |
| } else { | |
| poc_lsb_lt[ i ] | |
| used_by_curr_pic_lt_flag[ i ] | |
| } | |
| delta_poc_msb_present_flag[ i ] | |
| if( delta_poc_msb_present_flag[ i ]) | |
| delta_poc_msb_cycle_lt[ i ] | |
| } | |
| } | |
| if( sps_temporal_mvp_enabled_flag) | |
| slice_temporal_mvp_enabled_flag | |
| } | |
| if( sample_adaptive_offset_enabled_flag) { | |
| slice_sao_luma_flag | |
| if( ChromaArrayType != 0) | |
| slice_sao_chroma_flag | |
| } | |
| if( slice_type == P || slice_type == B) { | |
| num_ref_idx_active_override_flag | |
| if( num_ref_idx_active_override_flag ) { | |
| num_ref_idx_l0_active_minus1 | |
| if( slice_type == B) | |
| num_ref_idx_l1_active_minus | |
| } | |

| | descriptor |
|---|---|
| if( lists_modification_present_flag && NumPicTotalCurr > 1 ) | |
| ref_pic_lists_modification() | |
| if( slice_type == B) | |
| mvd_l1_zero_flag | u(1) |
| if( cabac_init_present_flag) | |
| cabac_init_flag | u(1) |
| if( slice_temporal_mvp_enabled_flag) { | |
| if( slice_type == B ) | |
| collocated_from_l0_flag | u(1) |
| if( ( collocated_from_l0_flag && num_ref_idx_l0_active_minus1>0) \|\| | |
| ( !collocated_from_l0_flag && num_ref_idx_l1_active_minus1>0) ) | |
| collocated_ref_idx | ue(v) |
| } | |
| if( ( weighted_pred_flag && slice_type == P ) \|\| | |
| ( weighted_bipred_flag && slice_type == B ) ) | |
| pred_weight_table( ) | |
| five_minus_max_num_merge_cand | ue(v) |
| if( motion_vector_resolution_control_idc == 2) | |
| use_integer_mv_flag | u(1) |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| if( pps_slice_act_qp_offsets_present_flag ) { | |
| slice_act_y_qp_offset | se(v) |
| slice_act_cb_qp_offset | se(v) |
| slice_act_cr_qp_offset | se(v) |
| } | |
| if( chroma_qp_offset_list_enabled_flag ) | |
| cu_chroma_qp_offset_enabled_flag | u(1) |
| if( deblocking_filter_override_enabled_flag ) | |
| deblocking_filter_override_flag | u(1) |
| if( deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| } | |
| } | |
| if( pps_loop_filter_across_slices_enabled_flag && | |
| ( slice_sao_luma_flag \|\| slice_sao_chroma_flag \|\| | |
| !slice_deblocking_filter_disabled_flag ) ) | |
| slice_loop_filter_across_slices_enabled_flag | u(1) |
| } | |
| if( tiles_enabled_flag \|\| entropy_coding_sync_enabled_flag ) { | |
| num_entry_point_offsets | ue(v) |
| if( num_entry_point_offsets > 0) { | |
| offset_len_minus1 | ue(v) |
| for( i = 0; i < num_entry_point_offsets; i++ ) | |
| entry_point_offset_minus1[ i ] | ue(v) |
| } | |
| } | |
| if( slice_segment_header_extension_present_flag ) { | |
| slice_segment_header_extension_length | ue(v) |
| for( i=0; i<slice_segment_header_extension_length; i++ ) | |
| slice_segment_header_extension_data_byte[ i ] | u(8) |
| } | |
| byte_alignment() | |
| } | |

Fig. 4c

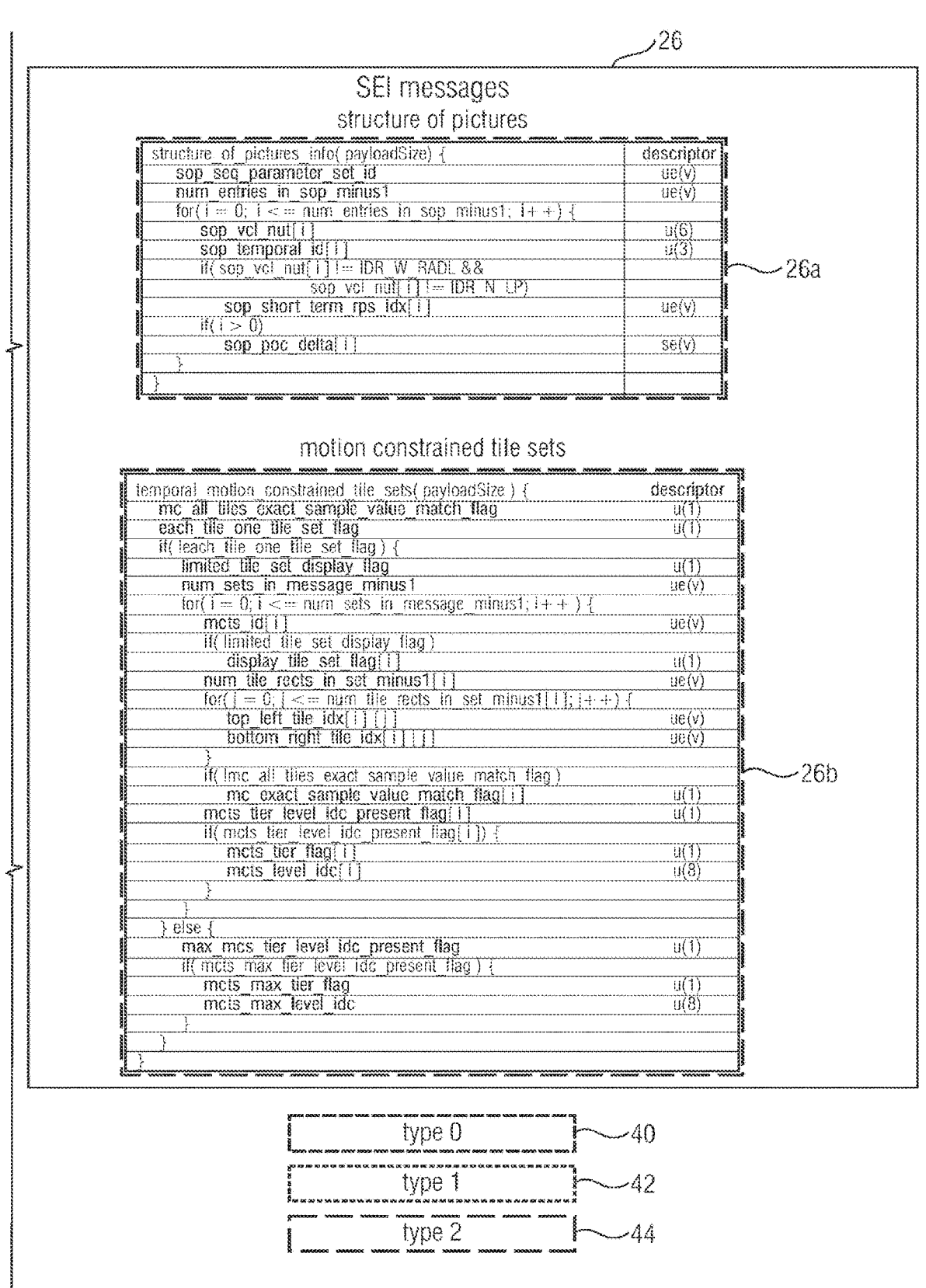

26

SEI messages
structure of pictures

| structure_of_pictures_info( payloadSize) { | descriptor |
|---|---|
| sop_seq_parameter_set_id | ue(v) |
| num_entries_in_sop_minus1 | ue(v) |
| for( i = 0; i <= num_entries_in_sop_minus1; i++) { | |
| sop_vcl_nut[ i ] | u(6) |
| sop_temporal_id[ i ] | u(3) |
| if( sop_vcl_nut[ i ] != IDR_W_RADL && | |
| sop_vcl_nut[ i ] != IDR_N_LP) | |
| sop_short_term_rps_idx[ i ] | ue(v) |
| if( i > 0 ) | |
| sop_poc_delta[ i ] | se(v) |
| } | |
| } | |

26a motion constrained tile sets

| temporal_motion_constrained_tile_sets( payloadSize ) { | descriptor |
|---|---|
| mc_all_tiles_exact_sample_value_match_flag | u(1) |
| each_tile_one_tile_set_flag | u(1) |
| if( !each_tile_one_tile_set_flag ) { | |
| limited_tile_set_display_flag | u(1) |
| num_sets_in_message_minus1 | ue(v) |
| for( i = 0; i <= num_sets_in_message_minus1; i++ ) { | |
| mcts_id[ i ] | ue(v) |
| if( limited_tile_set_display_flag ) | |
| display_tile_set_flag[ i ] | u(1) |
| num_tile_rects_in_set_minus1[ i ] | ue(v) |
| for( j = 0; j <= num_tile_rects_in_set_minus1[ i ]; j++ ) { | |
| top_left_tile_idx[ i ][ j ] | ue(v) |
| bottom_right_tile_idx[ i ][ j ] | ue(v) |
| } | |
| if( !mc_all_tiles_exact_sample_value_match_flag ) | |
| mc_exact_sample_value_match_flag[ i ] | u(1) |
| mcts_tier_level_idc_present_flag[ i ] | u(1) |
| if( mcts_tier_level_idc_present_flag[ i ] ) { | |
| mcts_tier_flag[ i ] | u(1) |
| mcts_level_idc[ i ] | u(8) |
| } | |
| } | |
| } else { | |
| max_mcts_tier_level_idc_present_flag | u(1) |
| if( mcts_max_tier_level_idc_present_flag ) { | |
| mcts_max_tier_flag | u(1) |
| mcts_max_level_idc | u(8) |
| } | |
| } | |
| } | |

26b

| type 0 | 40 |
|---|---|
| type 1 | 42 |
| type 2 | 44 |

| | descriptor |
|---|---|
| seq_parameter_set_rbsp( ) { | |
| sps_video_parameter_set_id | u(4) |
| sps_max_sub_layers_minus1 | u(3) |
| sps_temporal_id_nesting_flag | u(1) |
| profile_tier_level(1, sps_max_sub_layers_minus1) | |
| sps_seq_parameter_set_id | ue(v) |
| chroma_format_idc | ue(v) |
| if( chroma_format_idc = = 3 ) | |
| separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 );<br>i <= sps_max_sub_layers_minus1; i++) { | |
| sps_max_dec_pic_buffering_minus1[ i ] | ue(v) |
| sps_max_num_reorder_pics[ i ] | ue(v) |
| sps_max_latency_increase_plus1[ i ] | ue(v) |
| } | |
| log2_min_luma_coding_block_size_minus3 | ue(v) |
| log2_diff_max_min_luma_coding_block_size | ue(v) |
| log2_min_luma_transform_block_size_minus2 | ue(v) |
| log2_diff_max_min_luma_transform_block_size | ue(v) |
| max_transform_hierarchy_depth_inter | ue(v) |
| max_transform_hierarchy_depth_intra | ue(v) |
| scaling_list_enabled_flag | u(1) |
| if( scaling_list_enabled_flag ) { | |
| sps_scaling_list_data_present_flag | u(1) |
| if( sps_scaling_list_data_present_flag ) | |
| scaling_list_data( ) | |
| } | |
| amp_enabled_flag | u(1) |
| sample_adaptive_offset_enabled_flag | u(1) |
| pcm_enabled_flag | u(1) |
| if( pcm_enabled_flag ) { | |
| pcm_sample_bit_depth_luma_minus1 | u(4) |
| pcm_sample_bit_depth_chroma_minus1 | u(4) |

| | |
|---|---|
| log2_min_pcm_luma_coding_block_size_minus3 | ue(v) |
| log2_diff_max_min_pcm_luma_coding_block_size | ue(v) |
| pcm_loop_filter_disabled_flag | u(1) |
| } | |
| num_short_term_ref_pic_sets | ue(v) |
| for( i = 0; i < num_short_term_ref_pic_sets; i++) | |
| st_ref_pic_set( i ) | |
| long_term_ref_pics_present_flag | u(1) |
| if( long_term_ref_pics_present_flag) { | |
| num_long_term_ref_pics_sps | ue(v) |
| for( i = 0; i < num_long_term_ref_pics_sps; i++) { | |
| lt_ref_pic_poc_lsb_sps[ i ] | u(v) |
| used_by_curr_pic_lt_sps_flag[ i ] | u(1) |
| } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag) | |
| vui_parameters( ) | |
| sps_extension_present_flag | u(1) |
| if( sps_extension_present_flag) { | |
| sps_range_extension_flag | u(1) |
| sps_multilayer_extension_flag | u(1) |
| sps_3d_extension_flag | u(1) |
| sps_scc_extension_flag | u(1) |
| sps_extension_4bits | u(4) |
| } | |
| if( sps_range_extension_flag) | |
| sps_range_extension( ) | |
| if( sps_multilayer_extension_flag) | |
| sps_multilayer_extension()  /* specified in Annex F */ | |
| if( sps_3d_extension_flag) | |
| sps_3d_extension() /* specified in Annex I */ | |
| if( sps_scc_extension_flag) | |
| sps_scc_extension() | |
| if( sps_extension_4bits) | |
| while( more_rbsp_data( ) ) | |
| sps_extension_data_flag | u(1) |
| rbsp_trailing_bits() | |
| } | |

| pic_parameter_set_rbsp( ) { | descriptor |
|---|---|
| pps_pic_parameter_set_id | ue(v) |
| pps_seq_parameter_set_id | ue(v) |
| dependent_slice_segments_enabled_flag | u(1) |
| output_flag_present_flag | u(1) |
| num_extra_slice_header_bits | u(3) |
| sign_data_hiding_enabled_flag | u(1) |
| cabac_init_present_flag | u(1) |
| num_ref_idx_l0_default_active_minus1 | ue(v) |
| num_ref_idx_l1_default_active_minus1 | ue(v) |
| init_qp_minus26 | se(v) |
| constrained_intra_pred_flag | u(1) |
| transform_skip_enabled_flag | u(1) |
| cu_qp_delta_enabled_flag | u(1) |
| if( cu_qp_delta_enabled_flag ) | |
| diff_cu_qp_delta_depth | ue(v) |
| pps_cb_qp_offset | se(v) |
| pps_cr_qp_offset | se(v) |
| pps_slice_chroma_qp_offsets_present_flag | u(1) |
| weighted_pred_flag | u(1) |
| weighted_bipred_flag | u(1) |
| transquant_bypass_enabled_flag | u(1) |
| tiles_enabled_flag | u(1) |
| entropy_coding_sync_enabled_flag | u(1) |
| if( tiles_enabled_flag ) { | |
| num_tile_columns_minus1 | ue(v) |
| num_tile_rows_minus1 | ue(v) |
| uniform_spacing_flag | u(1) |
| if( !uniform_spacing_flag ) { | |
| for( i = 0; i < num_tile_columns_minus1 ; i++ ) | |
| column_width_minus1[ i ] | ue(v) |
| for( i = 0; i < num_tile_rows_minus1; i++ ) | |
| row_height_minus1[ i ] | ue(v) |
| } | |
| loop_filter_across_tiles_enabled_flag | u(1) |
| } | |
| pps_loop_filter_across_slices_enabled_flag | u(1) |
| deblocking_filter_control_present_flag | u(1) |
| if( deblocking_filter_control_present_flag ) { | |
| deblocking_filter_override_enabled_flag | u(1) |
| pps_deblocking_filter_disabled_flag | u(1) |
| if( !pps_deblocking_filter_disabled_flag) { | |
| pps_beta_offset_div2 | se(v) |
| pps_tc_offset_div2 | se(v) |
| } | |
| } | |

Fig. 6a

| | |
|---|---|
| pps_scaling_list_data_present_flag | u(1) |
| if( pps_scaling_list_data_present_flag ) | |
|     scaling_list_data( ) | |
| lists_ modification_present_flag | u(1) |
| log2_parallel_merge_level_minus2 | ue(v) |
| slice_segment_header_extension_present_flag | u(1) |
| pps_extension_present_flag | u(1) |
| if( pps_extension_present_flag) { | |
|     pps_range_extension_flag | u(1) |
|     pps_multilayer_extension_flag | u(1) |
|     pps_3d_extension_flag | u(1) |
|     pps_scc_extension_flag | u(1) |
|     pps_extension_4bits | u(4) |
| } | |
| if( pps_range_extension_flag) | |
|     pps_range_extension( ) | |
| if( pps_multilayer_extension_flag ) | |
|     pps_multilayer_extension() /* specified in Annex F */ | |
| if( pps_3d_extension_flag) | |
|     pps_3d_extension( ) /* specified in Annex I */ | |
| if ( pps_scc_extension_flag ) | |
|     pps_scc_extension( ) | |
| if( pps_extension_4bits ) | |
|     while( more_rbsp_data( ) ) | |
|        pps_extension_data_flag | u(1) |
|     rbsp_trailing_bits() | |
| } | |

| slice_segment_in_pic_flag | descriptor |
|---|---|
|    first_slice_segment_in_pic_flag | u(1) |
|    if( nal_unit_type >= BLA_W_LP && nal_unit_type <= RSV_IRAP_VCL23 ) | |
|       no_output_of_prior_pics_flag | u(1) |
|    slice_pic_parameter_set_id | ue(v) |
|    if( !first_slice_segment_in_pic_flag ) { | |
|       if( dependent_slice_segments_enabled_flag ) | |
|          dependent_slice_segment_flag | u(1) |
|       slice_segment_address | ue(v) |
|    } | |
|    if( !dependent_slice_segment_flag ) { | |
|       i = 0 | |
|       if( num_extra_slice_header_bits > i ) { | |
|          i++ | |
|          discardable_flag | u(1) |
|       } | |
|       if( num_extra_slice_header_bits > i ) { | |
|          i++ | |
|          cross_layer_bla_flag | u(1) |
|       } | |
|       for(; i < num_extra_slice_header_bits; i++) | |
|          slice_reserved_flag[ i ] | u(1) |
|       slice_type | ue(v) |
|       if( output_flag_present_flag ) | |
|          pic_output_flag | u(1) |
|       if( separate_colour_plane_flag == 1 ) | |
|          colour_plane_id | u(2) |
|       if( ( nuh_layer_id > 0 && | |
|          !poc_lsb_not_present_flag[ LayerIdxInVps[ nuh_layer_id ] ] ) \|\| | |
|          (nal_unit_type != IDR_W_RADL && nal_unit_type != IDR_N_LP ) ) | |
|       slice_pic_order_cnt_lsb | u(v) |
|       if( nal_unit_type != IDR_W_RADL && nal_unit_type != IDR_N_LP ) { | |
|          short_term_ref_pic_set_sps_flag | u(1) |
|          if( !short_term_ref_pic_set_sps_flag) | |
|             st_ref_pic_set(num_short_term_ref_pic_sets) | |
|          else if( num_short_term_ref_pic_sets > 1 ) | |
|             short_term_ref_pic_set_idx | u(v) |
|          if( long_term_ref_pics_present_flag) { | |

Fig. 7a

| | |
|---|---|
| if( num_long_term_ref_pics_sps > 0) | |
|    num_long_term_sps | ue(v) |
| num_long_term_pics | ue(v) |
| for( i = 0; i < num_long_term_sps + num_long_term_pics; i++ ) { | |
|    if( i < num_long_term_sps ) { | |
|       if( num_long_term_ref_pics_sps > 1 ) | |
|          lt_idx_sps[ i ] | u(v) |
|    } else { | |
|       poc_lsb_lt[ i ] | u(v) |
|       used_by_curr_pic_lt_flag[ i ] | u(1) |
|    } | |
|    delta_poc_msb_present_flag[ i ] | u(1) |
|    if( delta_poc_msb_present_flag[ i ] ) | |
|       delta_poc_msb_cycle_lt[ i ] | ue(v) |
|    } | |
| } | |
|    if( sps_temporal_mvp_enabled_flag) | |
|       slice_temporal_mvp_enabled_flag | u(1) |
| } | |
| if( nuh_layer_id > 0 && !default_ref_layers_active_flag && | |
|         NumRefListLayers[ nuh_layer_id ] > 0) { | |
|    inter_layer_pred_enabled_flag | u(1) |
|    if( inter_layer_pred_enabled_flag && NumRefListLayers[ nuh_layer_id ] > 1) { | |
|       if( !max_one_active_ref_layer_flag) | |
|          num_inter_layer_ref_pics_minus1 | u(v) |
|       if( NumActiveRefLayerPics != NumRefListLayers[ nuh_layer_id ] ) | |
|          for( i = 0; i < NumActiveRefLayerPics; i++ ) | |
|             inter_layer_pred_layer_idc[ i ] | u(v) |
|    } | |
| } | |
| if( inCmpPredAvailFlag ) | |
|    in_comp_pred_flag | u(1) |
| if( sample_adaptive_offset_enabled_flag) { | |
|    slice_sao_luma_flag | u(1) |
|    if( ChromaArrayType != 0) | |
|       slice_sao_chroma_flag | u(1) |
| } | |
| if( slice_type == P || slice_type == B) { | |
|    num_ref_idx_active_override_flag | u(1) |
|    if( num_ref_idx_active_override_flag) { | |
|       num_ref_idx_l0_active_minus1 | ue(v) |
|       if( slice_type == B) | |
|          num_ref_idx_l1_active_minus1 | ue(v) |
|    } | |
|    if( lists_modification_present_flag && NumPicTotalCurr > 1 ) | |
|       ref_pic_lists_modification( ) | |
|    if( slice_type == B) | |
|       mvd_l1_zero_flag | ue(1) |
|    if( cabac_init_present_flag) | |

Fig. 7b

| | |
|---|---|
| cabac_init_flag | u(1) |
| if( slice_temporal_mvp_enabled_flag) { | |
| if( slice_type = = B ) | |
| collocated_from_l0_flag | u(1) |
| if( ( collocated_from_l0_flag && num_ref_idx_l0_active_minus1 > 0 )  \|\|   ( !collocated_from_l0_flag && num_ref_idx_l1_active_minus1 > 0 ) ) | |
| collocated_ref_idx | ue(v) |
| } | |
| if( ( weighted_pred_flag && slice_type = = P )  \|\|   ( weighted_bipred_flag && slice_type = = B ) ) | |
| pred_weight_table( ) | |
| else if( !DepthFlag && NumRefListLayers[ nuh_layer_id ] > 0) { | |
| slice_ic_enabled_flag | u(1) |
| if( slice_ic_enabled_flag ) | |
| slice_ic_disabled_merge_zero_idx_flag | u(1) |
| } | |
| five_minus_max_num_merge_cand | ue(v) |
| } | |
| slice_qp_delta | se(v) |
| if( pps_slice_chroma_qp_offsets_present_flag ) { | |
| slice_cb_qp_offset | se(v) |
| slice_cr_qp_offset | se(v) |
| } | |
| if( chroma_qp_offset_list_enabled_flag ) | |
| cu_chroma_qp_offset_enabled_flag | u(1) |
| if( deblocking_filter_override_enabled_flag ) | |
| deblocking_filter_override_flag | u(1) |
| if( deblocking_filter_override_flag ) { | |
| slice_deblocking_filter_disabled_flag | u(1) |
| if( !slice_deblocking_filter_disabled_flag ) { | |
| slice_beta_offset_div2 | se(v) |
| slice_tc_offset_div2 | se(v) |
| } | |
| } | |
| if( pps_loop_filter_across_slices_enabled_flag &&   ( slice_sao_luma_flag  \|\|  slice_sao_chroma_flag  \|\|   !slice_deblocking_filter_disabled_flag ) ) | |
| slice_loop_filter_across_slices_enabled_flag | u(1) |
| if( cp_in_slice_segment_header_flag[ ViewIdx ] ) | |
| for( m = 0; m < num_cp[ ViewIdx ]; m+ + ) { | |
| j = cp_ref_voi[ ViewIdx ][ m ] | |
| cp_scale[ j ] | se(v) |
| cp_off[ j ] | se(v) |
| cp_inv_scale_plus_scale[ j ] | se(v) |
| cp_inv_off_plus_off[ j ] | se(v) |
| } | |
| } | |
| if( tiles_enabled_flag  \|\|  entropy_coding_sync_enabled_flag ) { | |
| num_entry_point_offsets | ue(v) |

| | |
|---|---|
| if( num_entry_point_offsets > 0) { | |
|     offset_len_minus1 | ue(v) |
|     for( i = 0; i < num_entry_point_offsets; i++) | |
|         entry_ point_offset_minus1[ i ] | u(v) |
|     } | |
| } | |
| if( slice_segment_header_extension_present_ flag ) { | |
|     slice_segment_header_extension_length | ue(v) |
|     if( poc_reset_info_present_flag ) | |
|         poc_reset_idc | u(2) |
|     if( poc_reset_idc != 0) | |
|         poc_reset_period_id | u(6) |
|     if( poc_reset_idc == 3 ) { | |
|         full_poc_reset_flag | u(1) |
|         poc_lsb_val | u(v) |
|     } | |
|     if( !PocMsbValRequiredFlag && vps_poc_lsb_aligned_flag) | |
|         poc_msb_cycle_ val_present_flag | u(1) |
|     if( poc_msb_cycle_val_present_flag ) | |
|         poc_msb_cycle_val | ue(v) |
|     while( more_data_in_slice_segment_header_extension( ) ) | |
|         slice_segment_header_extension_data_bit | u(1) |
|   } | |
|   byte_alignment() | |
| } | |

| structure_of_pictures_info( payloadSize) { | descriptor |
|---|---|
| sop_seq_parameter_set_id | ue(v) |
| num_entries_in_sop_minus1 | ue(v) |
| for( i = 0; i <= num_entries_in_sop_minus1; i++) { | |
| sop_vcl_nut[ i ] | u(6) |
| sop_temporal_id[ i ] | u(3) |
| if( sop_vcl_nut[ i ] != IDR_W_RADL &&　　　　　　　　sop_vcl_nut[ i ] != IDR_N_LP) | |
| sop_short_term_rps_idx[ i ] | ue(v) |
| if( i > 0) | |
| sop_poc_delta[ i ] | se(v) |
| } | |
| } | |

| temporal_motion_constrained_tile_sets( payloadSize ) { | descriptor |
|---|---|
|   mc_all_tiles_exact_sample_value_match_flag | u(1) |
|   each_tile_one_tile_set_flag | u(1) |
|   if( !each_tile_one_tile_set_flag ) { | |
|     limited_tile_set_display_flag | u(1) |
|     num_sets_in_message_minus1 | ue(v) |
|     for( i = 0; i <= num_sets_in_message_minus1; i++ ) { | |
|       mcts_id[ i ] | ue(v) |
|       if( limited_tile_set_display_flag ) | |
|         display_tile_set_flag[ i ] | u(1) |
|       num_tile_rects_in_set_minus1[ i ] | ue(v) |
|       for( j = 0; j <= num_tile_rects_in_set_minus1[ i ]; j++ ) { | |
|         top_left_tile_idx[ i ] [ j ] | ue(v) |
|         bottom_right_tile_idx[ i ] [ j ] | ue(v) |
|       } | |
|       if( !mc_all_tiles_exact_sample_value_match_flag ) | |
|         mc_exact_sample_value_match_flag[ i ] | u(1) |
|       mcts_tier_level_idc_present_flag[ i ] | u(1) |
|       if( mcts_tier_level_idc_present_flag[ i ] ) { | |
|         mcts_tier_flag[ i ] | u(1) |
|         mcts_level_idc[ i ] | u(8) |
|       } | |
|     } | |
|   } else { | |
|     max_mcs_tier_level_idc_present_flag | u(1) |
|     if( mcts_max_tier_level_idc_present_flag ) { | |
|       mcts_max_tier_flag | u(1) |
|       mcts_max_level_idc | u(8) |
|     } | |
|   } | |
| } | |

Fig. 9

50 input video stream →

12a merged video stream → receiver — 52 merging method decider — 54 merge processor — 56 input video stream →

12b

60

70 type 0 merge identifiers
substream a

70a

70b substream b

80 type 1 merge identifiers
substream a

80a

80b substream b difference assocaited
to a certain syntax
element value

⟹ indicates necessary
adjustment for merging
according to type 1

| subpic_level_info( payloadSize ) { | descriptor |
|---|---|
| sli_num_ref_levels_minus1 | u(3) |
| sli_cbr_constraint_flag | u(1) |
| sli_explicit_fraction_present_flag | u(1) |
| if( sli_explicit_fraction_present_flag ) | |
| sli_num_subpics_minus1 | ue(v) |
| sli_max_sublayers_minus1 | u(3) |
| sli_sublayer_info_present_flag | u(1) |
| while( !byte_aligned( ) ) | |
| sli_alignmant_zero_bit | f(1) |
| for( k = sli_sublayer_info_present_flag ? 0 : sli_max_sublayers_minus1;<br> k <= sli_max_sublayers_minus1; k++ ) | |
| for( i = 0; i <= sli_num_ref_levels_minus1; i++ ) { | |
| sli_non_subpic_layers_fraction[ i ][ k ]　　—— 100 | u(8) |
| sli_ref_level_idc[ i ][ k ]　　—— 102 | u(8) |
| if(sli_explicit_fraction_present_flag ) | |
| for(j = 0; j <= sli_num_subpics_minus1; j++ ) | |
| sli_ref_level_fraction_minus1[ i ][ j ][ k ]　　—— 140 | u(8) |
| } | |
| } | |

Fig. 16

BITSTREAM MERGING

CROSS-REFERENCE TO RELATED APPLICATIONS

This application is a continuation of U.S. application Ser. No. 17/199,984, filed Mar. 12, 2021, which is a continuation of PCT International Application No. PCT/EP2019/074436, filed Sep. 12, 2019, which claims priority to European Application No. 18194348.1, filed Sep. 13, 2018, the entire contents of each of which are incorporated herein by reference in this application.

The present application is concerned with video coding/decoding.

BACKGROUND OF THE INVENTION

Video compositing is used in numerous applications in which a composition of multiple video sources is presented to the user. Common examples are picture-in-picture (PiP) compositing and blending of overlays with video content, e.g. for advertisements or user interfaces. Producing such compositions in the pixel-domain requires parallel decoding of input video bitstreams that is computationally complex and may even be infeasible on devices with a single hardware decoder or otherwise limited resources. For instance, in current IPTV system designs, capable set top boxes carry out compositing and are a major service cost factor due to their complexity, distribution and limited lifetime. Reducing these cost factors motivates ongoing efforts to virtualize set top box functionality, e.g. shifting user interface generation to cloud resources. Mere video decoders, so-called zero clients, are the only hardware to remain at the customer premises in such an approach. The state of the art in such a system design is compositing based on transcoding, i.e. in its simplest form: decoding, pixel-domain compositing, and re-encoding before or during transport. To reduce the workload from a full de- and encoding cycle, operation in the transform coefficient domain instead of the pixel-domain was first proposed for PiP compositing. Since then, numerous techniques to fuse or cut short the individual compositing steps and apply them to current video codecs were proposed. However, transcoding based approaches for general compositing are still computationally complex which compromises system scalability. Depending on the transcoding approach, such compositing may also impact rate distortion (RD) performance.

In addition, there exist a wide range of applications that are built upon tiles, wherein a tile is a spatial subset of the video plane coded independently from neighboring tiles. Tile-based streaming systems for 360° video work by splitting 360° video into tiles that are encoded into sub-bitstreams at various resolutions and merged into a single bitstream on client-side depending on the current user viewing orientation. Another application involving merging of sub-bitstreams is for instance the combination of traditional video content together with banner advertisements. Further, recombining sub-bitstreams can also be a crucial part in video conferencing systems where multiple users send their individual video streams to a receiver where the streams are ultimately merged. Even further, tile-based cloud encoding systems in which a video is divided into tiles and tile encodings are distributed to separate and independent instances rely on failsafe checks before the resulting tile bitstreams are merged back into a single bitstream. In all these applications, streams are merged to allow decoding on a single video decoder with a known conformance point.

Merging herein is meant as a lightweight bitstream rewriting that does not require full de- and encoding operations of the entropy coded data of a bitstream or pixel value reconstruction. However, the techniques used to ensure the success of forming the bitstream merging, i.e. conformity of the resulting merged bitstream, originated from very different application scenarios.

For instance, legacy codecs support a technique referred to as Motion Constrained Tile Sets (MCTS) wherein an encoder constrains inter-prediction between pictures to be confined within the boundaries of tiles or the picture, i.e. not using sample values or syntax element values that do not belong to the same tile or are located outside the picture boundary. The origin of this technology is Region of Interest (ROI) decoding, in which a decoder can decode only a specific sub section of the bitstream and coded picture without running into unresolvable dependencies and avoiding drift. Another state-of-the-art technique in this context is the Structure of Pictures (SOP) SEI message which gives an indication of the applied bitstream structure, i.e. the picture order and the inter-prediction reference structure. This information is provided by summarizing for each picture between two Random Access Points (RAPs), the Picture Order Count (POC) values, the active Sequence Parameter Set (SPS) identifier, the Reference Picture Set (RPS) index into the active SPS. Based on this information, the bitstream structure can be identified which can assist transcoders, middleboxes or media-aware network entities (MANEs) or media players to operate on or alter bitstreams, e.g. adjustments of the bitrates, frame dropping or fast forwarding.

While both of the above exemplary signaling techniques are essential in understanding whether a lightweight merging of sub-bitstreams can be carried out without non-trivial syntax changes or even full transcoding, they are by no means sufficient. In more detail, lightweight merging in this context is characterized by interleaving NAL units of the source bitstreams with only minor rewrite operations, i.e. writing jointly used parameter sets with a new image size and tile structure, so that every bitstream to be merged will be located in a separate tile area. The next level of merging complexity is constituted by minor rewriting of slice header elements, ideally without changing variable length codes in the slice header. Further levels of merging complexity exist, e.g. to re-run entropy coding on slice data to alter specific syntax elements that are entropy encoded but can be changed without the need for pixel value reconstruction which can also considered beneficial and rather lightweight compared to a full transcode with de- and encode of the video are not considered lightweight.

In a merged bitstream, all slices have to refer to the same parameter sets. When the parameter sets of the original bitstreams use even significantly different settings, a lightweight merging may not be possible, because many of the parameter set syntax elements have further influence on the slice header and slice payload syntax and they do so to different degree. The further down the decoding process a syntax element is involved, the more complex merging/rewriting becomes. Some notable general categories of syntax dependencies (of the parameter set and other structures) can be differentiated as follows.

A. Syntax presence indication
B. Value calculation dependencies
C. Slice payload coding tool control
   a. Syntax that is used early in the decoding process (e.g. coefficient sign hiding, block partitioning limits)

b. Syntax that is used late in the decoding process (e.g. motion comp, loop filter) or general decoding process control (reference pictures, bitstream order)

D. Source format parameters

For category A, the parameter sets carry numerous presence flags for various tools (e.g. dependent_slice_segments_enabled_flag or output_flag_present_flag). In case of differences in such flags, the flag can be set to enable in the joint parameter set and default values can be written explicitly to the merged slice headers of slices in bitstreams which didn't include the syntax elements before merging, i.e. in this case merging requires changes to parameter sets and the slice header syntax.

For category B, signaled values of parameter set syntax may be used in calculations along with parameters of other parameter sets or slice headers, e.g. in HEVC, the slice quantization parameter (QP) of a slice is used to control the coarseness of transform coefficients quantization of the residual signal of a slice. Signaling of slice QP (SliceQpY) in a bitstream depends on QP signaling on picture parameter set (PPS) level as follows:

$$\text{SliceQpY} = 26 + \text{init\_qp\_minus26 (from PPS)} + \text{slice\_qp\_delta (from slice header)}$$

As every slice in a (merged) coded video pictures needs to reference the same activated PPS, a difference in init_qp_minus26 in PPSs of the individual streams that are to be merged requires the adjustment of slice headers to reflect the new common value of init_qp_minus26. i.e. in this case merging requires changes to parameter sets and the slice header syntax as for category 1.

For category C, further parameter set syntax elements control coding tools that influence bitstream structure of the slice payload. Sub-categories C.a and C.b can be differentiated depending on how far down the decoding process a syntax element is involved and (related to that) the complexity associated with changes to these syntax elements, i.e. where the syntax element is involved between entropy coding and pixel level reconstruction.

For instance, one element in category C.a is sign_data_hiding_enabled_flag which controls derivation of the sign data of coded transform coefficients. Sign data hiding can be deactivated easily and the corresponding inferred sign data is written explicitly into the slice payload. However, such changes to the slice payload in this category do not require going to the pixel domain through a full decode before encoding the pixel-wise merged video again. Another example is inferred block portioning decisions, or any other syntax where the inferred value can be easily written into the bitstream. I.e. in this case merging requires changes to parameter sets, the slice header syntax, and the slice payload which requires entropy de-/encoding.

However, sub-category C.b entails syntax elements that relate to processes far down the decoding chain and therefore, much of the complex decoding process has to be carried out anyway in a way that avoiding the remaining decoding steps is implementation- and computation-wise undesirable. For instance, differences in syntax elements connected to motion compensation constraints "Temporal Motion Constraint Tile Set SEI (Structure of Picture Information) message" or various decoding process related syntax such as "SEI message" make pixel level transcoding unavoidable. There are numerous encoder decisions that influence the slice payload in a way that cannot be changed without a full pixel level transcoding as opposed to sub-category C.a.

For category D, there are parameter set syntax elements (e.g. chroma subsampling as indicated through chroma_format_idc) where different values that make pixel-level transcoding unavoidable for merging sub-bitstreams. I.e., in this case merging requires a complete decode, pixel-level merge and complete encode process.

The above list is by no means exhaustive, but it becomes clear that a wide range of parameters influence the merits of merging sub-bitstreams into a common bitstream in different ways and that it is burdensome to track and analyze these parameters.

The object of the present invention is to provide a video codec to efficiently merge video bitstreams.

SUMMARY

An embodiment may have a video encoder for providing an encoded video representation, wherein the video encoder is configured to provide a coarse granularity capability demand information, which describes a compatibility of a video stream with a video decoder having a capability level out of a plurality of predetermined capability levels, and wherein the video encoder is configured to provide a fine granularity capability demand information, which describes which fraction of a permissible capability demand associated with one of the predetermined capability levels is required in order to decode the encoded video representation, and/or which describes which fraction of a permissible capability demand the encoded video representation contributes to a merged video stream, a capability demand of which is in agreement with one of the predetermined capability levels.

Another embodiment may have a video merger for providing a merged video representation on the basis of a plurality of encoded video representations, wherein the video merger is configured to receive a plurality of video streams having encoded parameter information describing a plurality of encoding parameters, encoded video content information, a coarse granularity capability demand information, which describes a compatibility of a video stream with a video decoder having a capability level out of a plurality of predetermined capability levels, and a fine granularity capability demand information, wherein the video merger is configured to merge the two or more video streams in dependence on the coarse granularity capability demand information and the fine granularity capability demand information.

Another embodiment may have a video decoder, wherein the video decoder has the above inventive video merger.

According to another embodiment, a method providing an encoded video representation may have the step of: providing a coarse granularity capability demand information, which describes a compatibility of a video stream with a video decoder having a capability level out of a plurality of predetermined capability levels, and wherein the video encoder is configured to provide a fine granularity capability demand information, which describes which fraction of a permissible capability demand associated with one of the predetermined capability levels is required in order to decode the encoded video representation, and/or which describes which fraction of a permissible capability demand the encoded video representation contributes to a merged video stream, a capability demand of which is in agreement with one of the predetermined capability levels.

According to still another embodiment, a method for providing a merged video representation on the basis of a plurality of encoded video representations may have the step of: receiving a plurality of video streams having encoded parameter information describing a plurality of encoding parameters, encoded video content information, a coarse granularity capability demand information, which describes a compatibility of a video stream with a video decoder having a capability level out of a plurality of predetermined capability levels, and a fine granularity capability demand information, wherein the video merger is configured to merge the two or more video streams in dependence on the coarse granularity capability demand information and the fine granularity capability demand information.

Another embodiment may have a non-transitory digital storage medium having stored thereon a computer program for performing the above inventive method providing an encoded video representation, when said computer program is run by a computer.

Another embodiment may have a non-transitory digital storage medium having stored thereon a computer program for performing the above inventive method for providing a merged video representation on the basis of a plurality of encoded video representations, when said computer program is run by a computer.

Another embodiment may have a data stream generated by the above inventive method providing an encoded video representation.

Still another embodiment may have a data stream generated by the above inventive method for providing a merged video representation on the basis of a plurality of encoded video representations.

Another embodiment may have a video decoder for decoding a provided video representation, wherein the video decoder is configured to receive the video representation including a plurality of sub video streams having encoded parameter information describing a plurality of encoding parameters, encoded video content information, a coarse granularity capability demand information, which describes a compatibility of a video stream with a video decoder having a capability level out of a plurality of predetermined capability levels, and a fine granularity capability demand information, wherein the video decoder is configured to determine whether a combined capability demand of the plurality of sub video streams to be merged, as described by the fine granularity capability demand information, is matched to predetermined limits to be adhered.

It is basic idea underlying the present invention that an improvement of merging a plurality of video stream is achieved by including one or more merging identifier. This approach makes it possible to reduce the load of computing resources and also to accelerate merging process.

In accordance with embodiments of the present application, the video encoder is configured to provide a video stream comprising encoded parameter information describing a plurality of encoding parameters, encoded video content information, i.e., encoded using encoding parameters defined by the parameter information, and one or more merge identifiers indicating whether and/or how, e.g., using which complexity, the encoded video representation can be merged with another encoded video representation. Using which complexity may be determined based on a parameter value defined by the parameter information. The merge identifier may be concatenation of a plurality of encoding parameters, such parameters which are to be equal in two different encoded video representations in order to be able to merge the two different encoded video representations using a predetermined complexity. In addition, the merge identifier may be a hash value of a concatenation of a plurality of encoding parameters, such parameters which are to be equal in two different encoded video representations in order to be able to merge the two different encoded video representations using a predetermined complexity.

In accordance with embodiments of the present application, the merge identifier may indicate a merge identifier type representing associated with a complexity of a merging procedure or, generally, a "suitable" merging method merging through parameter set rewriting, or merging through parameter sets and slice header rewriting, or merging through parameter sets, slice header, slice payload rewriting, wherein a merge identifier is associated to the merge identifier type, wherein the merge identifier associated to a merge identifier type comprises those encoding parameters which are to be equal in two different encoded video representations such that the two different encoded video representations are mergeable using the complexity of the merging procedure represented by the merge identifier type. A value of the merge identifier type may indicate a merging process, wherein the video encoder is configured to switch between at least two of the following values of the merge identifier type; a first value of the merge identifier type which represents a merging process through parameter set rewriting, a second value of the merge identifier type which represents a merging process through parameter sets and slice header rewriting, and a third value of the merge identifier type which represents a merging process through parameter sets, slice header, and slice payload rewriting.

In accordance with embodiments of the present application, a plurality of merge identifiers is associated with different complexity of merging procedures, e.g., each identifier indicates a parameter set/hash and a type of the merging procedure. The encoder may be configured to check whether the encoding parameters which are evaluated for a provision of the merge identifier are identical in all units of a video sequence, and to provide the merge identifier in dependence on the check.

In accordance with embodiments of the present application, the plurality of encoding parameters may include merging-relevant parameters which are to be identical in different video streams, i.e., encoded video representations, to allow for a merging having less complexity than merging by a full pixel decoding, and wherein the video encoder is configured to provide the one or more merge identifiers on the basis of the merging-relevant parameters, i.e., in case there is no common parameter between two encoded video representation, a full pixel decoding is performed, i.e., there is no possibility to reduce complexity of the merging process. The merging-relevant parameters include one or more or all out of the following parameters: a parameter describing a motion constraint at a tile boundary, e.g., motion constrain tail set supplemental enhancement information (MCTS SEI), information regarding a group of picture (GOP) structure, i.e., mapping of coding order to display order, Random Access Point indication, temporal layering, e.g. with SOP: Structure of Picture, SEI, a parameter which describes a chroma coding format and a parameter which describes a luma coding format, e.g., a set which includes at least chroma format and bit depth luma/chroma, a parameter which describes an advanced motion vector prediction, a parameter which describes a sample adaptive offset, a parameter which describes a temporal motion vector prediction, and a parameter which describes loop filter and other encoding parameters, i.e., parameter sets (including reference picture sets, base quantization parameter and etc.), slice header, slice payload are rewritten to merge two encoded video representation.

In accordance with embodiments of the present application, a merge identifier associated with a first complexity of a merging procedure may be determined on the basis of a first set of encoding parameters, when a merge parameter associated with a second complexity of a merging procedure, which is higher than the first complexity, is determined on the basis of a second set of encoding parameters, which is a true subset of the first set of encoding parameters. A merge identifier associated with a third complexity of a merging procedure, which is higher than the second complexity, may be determined on the basis of a third set of encoding parameters, which is a true subset of the second set of encoding parameters. The video encoder is configured to determine the merge identifier associated with the first complexity of the merging procedure on the basis of a set of encoding parameters, e.g., first set which are to be equal in two different video streams, e.g., encoded video representations to allow for a merging of the video streams which only modifies parameter sets which are applicable to a plurality of slices while leaving slice headers and slice payload unchanged, i.e., a merging process through parameter set rewriting (only). The video encoder may be configured to determine the merge identifier associated with the second complexity of the merging procedure on the basis of a set of encoding parameters, e.g., second set which are to be equal in two different video streams, e.g., encoded video representations to allow for a merging of the video streams which modifies parameter sets which are applicable to a plurality of slices and which also modifies slice headers while leaving slice payload unchanged, i.e., a merging process through parameter sets and slice header rewriting. The video encoder may be configured to determine the merge identifier associated with the third complexity of the merging procedure on the basis of a set of encoding parameters, e.g., third set which are to be equal in two different video streams, e.g., encoded video representations to allow for a merging of the video streams which modifies parameter sets which are applicable to a plurality of slices, and which also modifies slice headers and slice payload but which does not perform a full pixel decoding and pixel re-encoding, i.e. a merging process through parameter sets, slice header, and slice payload rewriting.

In accordance with embodiments of the present application, a video merger for providing a merged video representation on the basis of a plurality of encoded video representations, e.g., video streams, wherein the video merger is configured to receive a plurality of video streams comprising encoded parameter information describing a plurality of encoding parameters, encoded video content information, i.e., encoded using encoding parameters defined by the parameter information, and one or more merge identifiers indicating whether and/or how using which complexity the encoded video representation can be merged with another encoded video representation; wherein the video merger is configured to decide about a usage of a merging method, e.g., merge type; merge process, in dependence on the merge identifiers, i.e., in dependence on a comparison of merging identifiers of different video streams. The video merger is configured to select a merging method, out of a plurality of merging methods, in dependence on the merge identifiers. The video merger may be configured to select between at least two of the following merging methods; a first merging method, which is a merging of the video streams which only modifies parameter sets which are applicable to a plurality of slices while leaving slice headers and slice payload unchanged; a second merging method, which is a merging of the video streams which modifies parameter sets which are applicable to a plurality of slices and which also modifies slice headers while leaving slice payload unchanged; and a third merging method, which is a merging of the video streams which modifies parameter sets which are applicable to a plurality of slices, and which also modifies slice headers and slice payload but which does not perform a full pixel decoding and pixel re-encoding, which are merging methods having different complexities in dependence on the one or more merge identifiers.

In accordance with embodiments of the present application, the video merger is configured to compare merge identifiers of two or more video streams associated with the same given merge method or associated with the same merge identifier type and to make a decision whether to perform a merging using the given merge method in dependence on a result of the comparison. The video merger may be configured to selectively perform a merging using the given merge method if the comparison indicates that the merge identifiers of the two or more video streams associated with the given merge method are equal. The video merger may be configured to use a merging method having a higher complexity than the given merge method to which the compared merge identifiers are associated if the comparison of the merge identifiers indicates that the merge identifiers of the two or more video streams associated with the given merge method are different, i.e., without further comparing the encoding parameters themselves. The video merger may be configured to selectively compare encoding parameters which are to be equal in two or more video streams to allow for a merging of the video streams using the given merge method if the comparison of the merge identifiers indicates that the merge identifiers of the two or more video streams associated with the given merge method are equal, and wherein the video merger is configured to selectively perform a merging using the given merge method if the comparison of said encoding parameters, i.e., encoding parameters which are to be equal in two or more video streams to allow for a merging of the video streams using the given merge method, indicates that the encoding parameters are equal, and wherein the video merger is configured to perform a merging using a merge method having a higher complexity than the given merge method if the comparison of said encoding parameters indicates that the encoding parameters comprise a difference.

In accordance with embodiments of the present application, the video merger may be configured to compare merge identifiers associated with merging methods having different complexities, i.e., comparison of the hash, and wherein the video merger is configured to identify a lowest complexity merging method for which associated merge identifiers are equal in the two or more video streams to be merged; and wherein the video merger is configured to compare a set of encoding parameters, i.e., individual encoding parameters, rather than hash version thereof, which are to be equal in the two or more video streams to be merged to allow for a merging using identified merging method wherein different, typically overlapping sets of encoding parameters are associated with merging methods of different complexity, and wherein the video merger is configured to selectively merge the two or more video streams using the identified merging method if the comparison indicates that the encoding parameters of the set of encoding parameters associated with the identified merging method are equal in the video streams to be merged and wherein the video merger is configured to merge the two or more video streams using a merging method having a higher complexity that the identified merging method if the comparison indicates that the encoding parameters of the set of encoding parameters associated with the identified merging method comprise a difference. The video merger is configured to determine which encoding parameters should be modified in a merging process, i.e., merging video streams in dependence on one or more differences between merge identifiers e.g., associated with same merging method or "merge identifier type" of different video streams to be merged.

In accordance with embodiments of the present application, the video merger is configured to obtain joint encoding parameters or joint encoded parameter sets, e.g. sequence parameter set SPS and picture parameter set PPS, which are associated with slices of all the video streams to be merged, on the basis of encoding parameters of the video streams to be merged, and to include the joint encoding parameters into the merged video stream e.g., in case the value of all encoding parameters of one encoded video representation and other encoded video representation are the same, the encoding parameters are updated by copying the common parameters, in case there is any difference between the encoding parameters of encode video representations, the encoding parameters are updated based on the main (i.e., one is main, the other one is sub) encoded video representation, e.g., some encoding parameters may be adapted in accordance with the combination of the video streams, for example, a total picture size. The video merger is configured to adapt encoding parameters individually associated with individual video slices, e.g., defined in slice headers, or e.g., when using a merging method having a complexity which is higher than a lowest complexity, in order to obtain modified slices to be included into the merged video stream. The adapted encoding parameters include a parameter representing a picture size of the merged encoded video representation, wherein the picture size is calculated based on the picture size of the encoded video representations to be merged, i.e., in the respective dimensions and in context of their spatial arrangement.

In accordance with embodiments of the present application, a video encoder for providing an encoded video representation, i.e., video stream, wherein the video encoder may be configured to provide a coarse granularity capability demand information, e.g., level information; level 3 or level 4 or level 5, which describes a compatibility of a video stream with a video decoder, e.g., decodability of the video stream by a video decoder, having a capability level out of a plurality of predetermined capability levels, and wherein the video encoder is configured to provide a fine granularity capability demand information, e.g., merge level limit information, which describes which fraction of a permissible capability demand, i.e., decoder capability, associated with one of the predetermined capability levels is required in order to decode the encoded video representation, and/or which describes which fraction of a permissible capability demand, i.e., "level limit of merged bitstream", the encoded video representation, i.e., sub-bitstream contributes to a merged video stream into which the video stream is merged, a capability demand of which is in agreement with one of the predetermined capability levels, i.e., a capability demand of which is smaller than or equal to the permissible capability demand, "permissible capability demand of merged bit stream which is in agreement with one of the predetermined capability levels" corresponds to "level limit of merged bitstream". The video encoder is configured to provide the fine granularity capability demand information such that the fine granularity capability demand information comprises a ratio value or a percentage value which is referenced to one of the predetermined capability levels. The video encoder is configured to provide the fine granularity capability demand information such that the fine granularity capability demand information comprises a reference information and a fraction information, and wherein the reference information describes to which of the predetermined capability levels the fraction information is referenced such that the fine granularity capability demand information in its entirety describes a fraction of one of the predetermined capability levels.

In accordance with embodiments of the present application, a video merger for providing a merged video representation on the basis of a plurality of encoded video representations, i.e., video streams, wherein the video merger may be configured to receive a plurality of video streams comprising encoded parameter information describing a plurality of encoding parameters, encoded video content information, e.g., encoded using encoding parameters defined by the parameter information, a coarse granularity capability demand information, e.g., level information; level 3 or level 4 or level 5, which describes a compatibility of a video stream with a video decoder, i.e., decodability of the video stream by a video decoder, having a capability level out of a plurality of predetermined capability levels, and a fine granularity capability demand information, e.g., merge level limit information, wherein the video merger is configured to merge the two or more video streams in dependence on the coarse granularity capability demand information and the fine granularity capability demand information. The video merger may be configured to decide which video streams can be or are included into a merged video stream, i.e., without violating a permissible capability demand, i.e., such a capability demand of the merged video stream is in agreement with one of the predetermined capability levels in dependence on the fine resolution capability demand information. The video merger may be configured to decide whether a valid merged video stream, e.g., without violating a permissible capability demand, i.e., such that a capability demand of the merged video stream is in agreement with one of the predetermined capability levels can be obtained by merging the two or more video streams in dependence on the fine resolution capability demand information. The video merger is configured to sum up fine granularity capability demand information of a plurality of video streams to be merged, e.g., in order to decide which video streams can be included or in order to decide whether a valid merged video stream can be obtained.

In accordance with embodiments of the present application, a video decoder for decoding a provided video representation, wherein the video decoder is configured to receive the video representation including a plurality of sub video streams, i.e., a plurality of sub-bitstreams of a whole bitstream, comprising encoded parameter information describing a plurality of encoding parameters, encoded video content information, a coarse granularity capability demand information, which describes a compatibility of a video stream with a video decoder having a capability level out of a plurality of predetermined capability levels, and a fine granularity capability demand information, i.e., the respective information is for example carried in SEI message, wherein the video decoder is configured to determine whether a combined capability demand of the plurality of sub video streams to be merged, as described by the fine granularity capability demand information, is matched to predetermined limits to be adhered, i.e., level-specific limits of the decoder. The video decoder may be further configured to parse the received coarse granularity capability demand information and fine granularity capability demand information to obtain an indication of the capability level and a fraction of a permissible capability demand.

BRIEF DESCRIPTION OF THE DRAWINGS

Embodiments of the present application are described below with respect to the figures, among which:

FIGS. 4a to 4d show a schematic diagram illustrating an example of encoding parameters according to embodiments of the present application;

FIG. 5a, 5b shows a detailed sequence parameter set (SPS) example indicated in FIG. 4;

FIG. 6a, 6b shows a detailed picture parameter set (PPS) example indicating in FIG. 4;

FIG. 7a to 7d shows a detailed slice header example indicating in FIG. 4;

FIG. 8 shows a detailed structure of pictures in a supplement enhancement information (SEI) message indicating in FIG. 4;

FIG. 9 shows a detailed motion constrained tile sets in an SEI message indicating in FIG. 4;

FIG. 16 shows a structure example of a supplement enhancement information (SEI) message syntax indicating level information.

DETAILED DESCRIPTION OF THE INVENTION

The following description sets forth specific details such as particular embodiments, procedure, techniques, end etc. for purposes of explanation and not limitation. It will be appreciated by those skilled in the art that other embodiments may be employed apart from these specific details. For example, although the following description is facilitated using non-limiting example applications, the technology may be employed to any type of video codec. In some instances, detailed description of well-known methods, interfaces, circuits and devices are omitted so as to not obscure the description with unnecessary detail.

Equal or equivalent elements with equal or equivalent functionality are denoted in the following description by equal or equivalent reference signs.

The invention herein is to provide future video codecs such as VVC (Versatile Video Coding) with means to put an indication in each sub-bitstream that allows for identification of sub-bitstreams that may be merged together into a legal bitstream or for identification of sub-streams that cannot be merged together with a given level of complexity into a legal bitstream. The indication, referred to as "merge identifier" in the following, further provides information about the suitable merging method through an indication referred to as "merge identifier type". Given that two bitstreams carry the "merge identifier" and the same value thereof, a merging of the sub-bitstreams into a new joint bitstream with a given level of merging complexity (merging method related) is possible.

Figure 1:
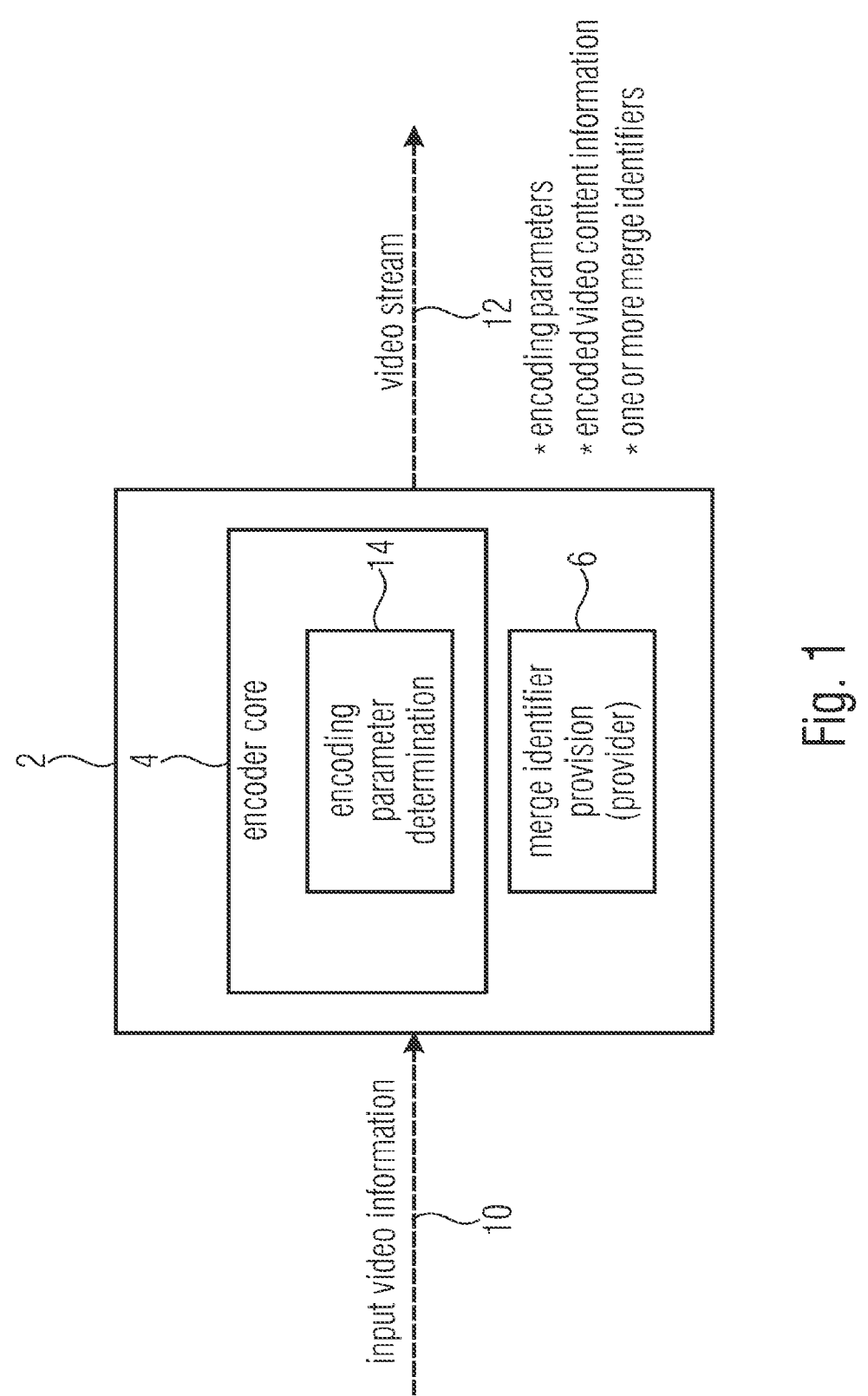
FIG. 1 shows a block diagram of an apparatus for providing an encoded video representation as an example of a video encoder where a bitstream merging concept according to embodiments of the present application could be implemented.
Figure 2:
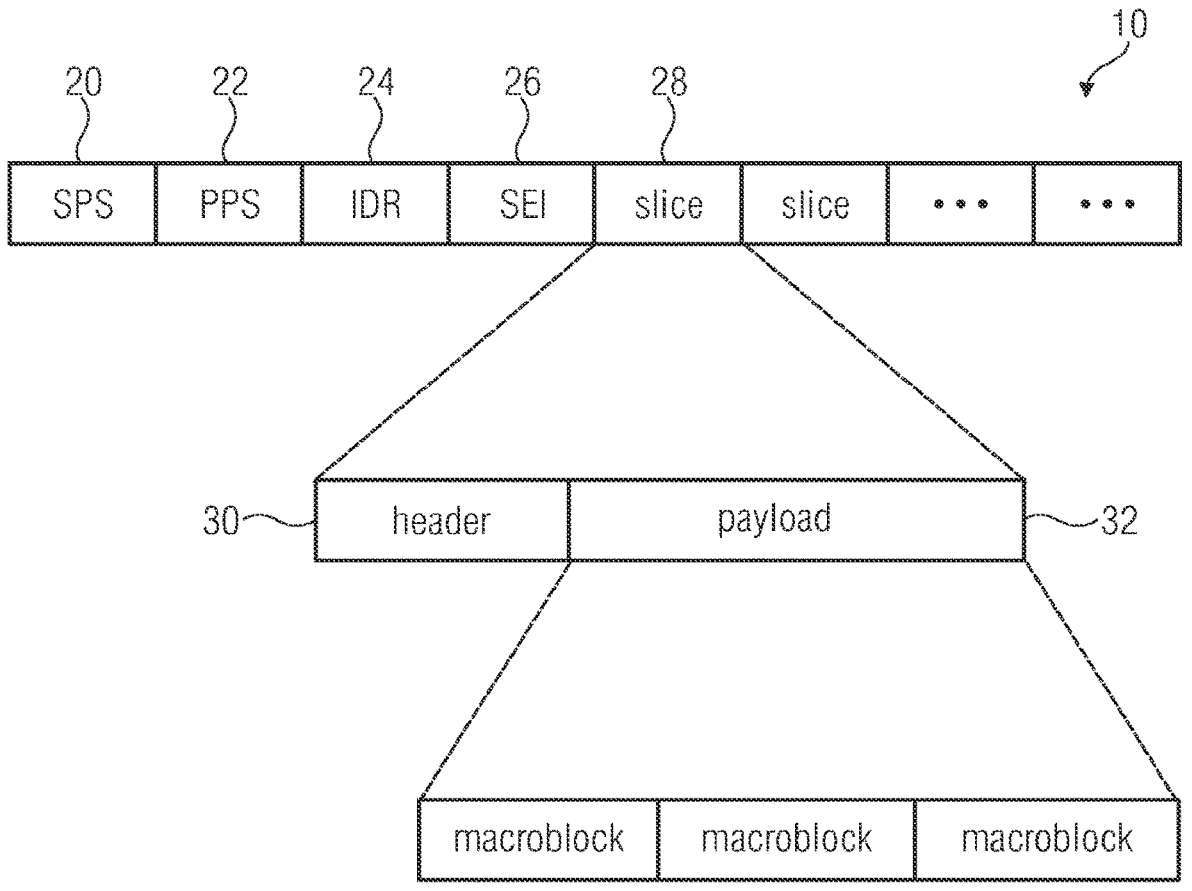
FIG. 2 shows a schematic diagram illustrating an example of a bitstream structure in accordance with embodiments of the present application.

FIG. 1 shows a video encoder 2 for providing an encoded video representation, i.e., encoded video stream 12 based on provided (input) video stream 10 comprising an encoder core 4 including an encoding parameter determination member 14, and a merge identifier provision 6. The provided video stream 10 as well as the encoded video stream 12 respectively has a bitstream structure, for example, as shown FIG. 2 as a simplified configuration. The bitstream structure is consist of a plurality of Network Abstraction Layer (NAL) units and each NAL units include various parameters and/or data, e.g., sequence parameter set (SPS) 20, picture parameter set (PPS) 22, instantaneous decoder refresh (IDR) 24, supplement enhancement information (SEI) 26, and a plurality of slices 28. The SEI 26 includes a variety of messages, i.e., structure of pictures, motion constrained tile sets and so on. The slice 28 comprises header 30 and payload 32. The encoding parameter determination member 14 determines an encoding parameter based on the SPS 20, PPS 22, SEI 26 and slice header 30. The IDR 24 is not necessary factor to determine the encoding parameter according to the present application, but the IDR 24 could be optionally included for determining the encoding parameter. The merge identifier provision 6 provides a merge identifier which indicates whether and/or how (with which complexity) the encoded video stream can be merged with another encoded video stream. The merge identifier determines a merge identifier which indicates a merge identifier type representing associated with a complexity of a merging procedure or, generally, a "suitable" merging method, e.g., merging through parameter set rewriting, or merging through parameter sets and slice header rewriting, or merging through parameter sets, slice header, slice payload rewriting, wherein a merge identifier is associated to the merge identifier type, wherein the merge identifier associated to a merge identifier type comprises those encoding parameters which are to be equal in two different encoded video representations such that the two different encoded video representations are mergeable using the complexity of the merging procedure represented by the merge identifier type.

As a result, the encoded video stream 12 includes encoded parameter information describing a plurality of encoding parameters, encoded video content information and one or more merge identifiers. In this embodiment, the merge identifier is determined based on the encoding parameters. However, it is also possible that the merge identifier value is to be set according to the wishes of the encoder operator with little guarantee of collision avoidance which could be sufficient for a closed system. Third party entities such as DVB (Digital Video Broadcasting), ATSC (Advanced Television Systems Committee) and the like could define values of the merge identifier to be used within their systems.

The merge identifier type is describing as below considering another embodiment according to the present invention using the FIGS. 3 to 9.

Figure 3:
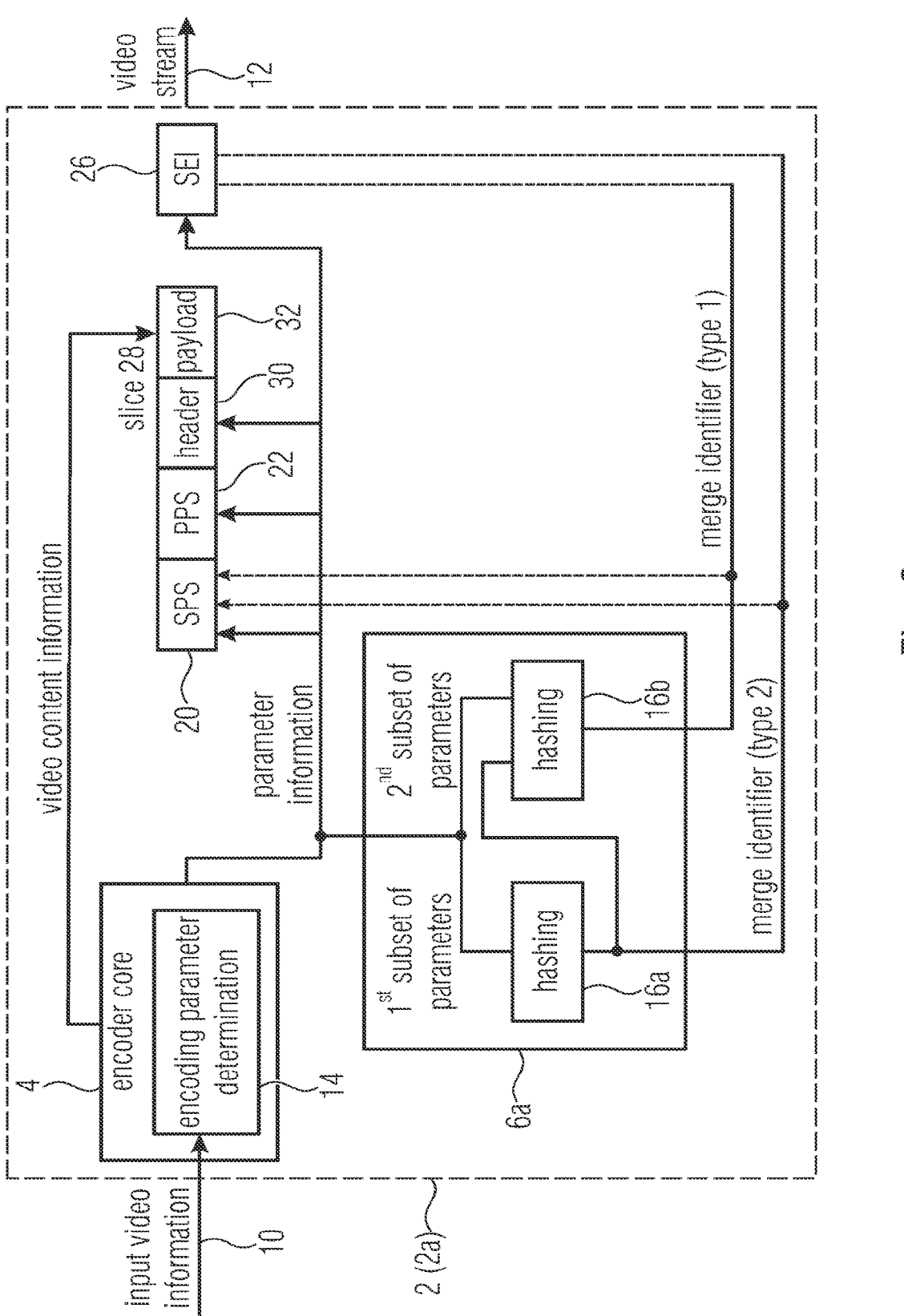
FIG. 3 shows a block diagram of an apparatus for providing an encoded video representation as another example of a video encoder where a bitstream merging concept according to embodiments of the present application could be implemented.

FIG. 3*a* shows an encoder 2 (2*a*) comprising an encoder core 4 and a merge identifier 6*a*, and indicating data flow in the encoder 2*a*. The merge identifier 6*a* includes a first hashing member 16*a* and a second hashing member 16*b* which provide hash value as the merge identifier to indicate a merging type. That is, merge value may be formed from a concatenation of coded values of a defined set of syntax elements (encoding parameters) of a bitstream, in the following referred to as hash set. The merge identifier value may be also formed by feeding the above concatenation of coded values into a well-known hash function such as MD5, SHA-3 or any other suitable function. As shown in FIG. 3, the input video stream 10 includes input video information and the input video stream 10 is processed at the encoder core 4. The encoder core 4 encodes the input video content and the encoded video content information is stored into the payload 32. The encoding parameter determination member 14 receives parameter information which includes the SPS, the PPS, the slice header and the SEI messages. This parameter information is stored in each corresponding units and received at the merge identifier provision 6*a*, i.e., received at the first and second hashing member 16*a* and 16*b* respectively. The first hashing member 16*a* produces a hash value, for example, indicating merge identifier type 2 based on the encoding parameters, and the second hashing member 16*b* produces a hash value, for example, indicating merge identifier type 1 based on the encoding parameters.

The content of the hash set, i.e. which syntax element (i.e., merging parameter) values are concatenated to from the merge identifier value, determines the quality of the merge-ability indication with respect to the above syntax categories.

For example, a merge identifier type indicates the suitable merging method with respect to a merge identifier, i.e., different levels of mergeability corresponding to the syntax elements incorporated in the hash set:

Type 0—Merge identifier for merging though parameter set rewriting

Type 1—Merge identifier for merging though parameter sets and slice header rewriting Type2—Merge identifier for merging though parameter sets, slice header, and slice payload rewriting For instance, given two input sub-bitstreams to be merged in context of an application, a device could compare the values of merge identifier and merge identifier type and conclude about the prospects of using the method associated with the merge identifier type on the two sub-bitstreams.

The following table gives a mapping between syntax element categories and the associated merging method.

| Syntax category | Merging method |
| --- | --- |
| A | 0 |
| B | 1 |
| C.a | 2 |
| C.b, D | Full transcode |

As already mentioned above, the syntax category is by no means exhaustive, but it becomes clear that a wide range of parameters influence the merits of merging sub-bitstreams into a common bitstream in different ways and that it is burdensome to track and analyze these parameters. In addition, the syntax category and the merging method (type) are not corresponding fully and therefore, some parameters are required, for example, for category B, but the same parameters are not required for merging method 1.

Merge identifier values according to two or more of the above merge identifier type values are produced and are written to the bitstream to allow a device easy identification of the applicable merging method. The merging method (type) 0 indicates a first value of the merge identifier type, the merging method (type) 1 indicates a second value of the merge identifier type, and the merging method (type) 3 indicates a third value of the merge identifier type.

Following exemplary syntax should be incorporated into the hash set.

Temporal Motion Constraint Tile Set SEI message that indicates a motion constraint at tile and picture boundaries (merging method 0, 1, 2, syntax category C.b)

Structure of Picture Information SEI message that defines the GOP structure (i.e. mapping of coding order to display order, Random Access Point indication, temporal layering, referencing structure) (merging method 0, 1, 2, syntax category C.b)

Parameter set syntax element values reference pictures sets (merging method 0, syntax category B)

chroma format (merging method 0,1,2, syntax category D)

base QP, chroma QP offsets (merging method 0, syntax category B)

bit depth luma/chroma (merging method 0,1,2, syntax category D)

hrd parameters initial arrival delay (merging method 0, syntax category B)

initial removal delay (merging method 0, syntax category B)

coding tools coding block structures (max/min block size, inferred splits) (merging method 0,1, syntax category C.a)

transform sizes (min/max) (merging method 0,1, syntax category C.a)

PCM block usage (merging method 0,1, syntax category C.a)

Advanced Motion Vector Prediction (merging method 0,1,2, syntax category C.b)

Sample Adaptive Offset (merging method 0, syntax category C.b)

Temporal Motion Vector Prediction (merging method 0,1,2, syntax category C.b)

intra smoothing (merging method 0,1, syntax category C.a)

dependent slices (merging method 0, syntax category A)

sign hiding (merging method 0,1, syntax category C.a)

weighted prediction (merging method 0, syntax category A)

transquant bypass (merging method 0,1, syntax category C.a)

entropy coding sync (merging method 0,1, syntax category C.a) (Skup4)

loop filter (merging method 0,1,2 syntax category C.b)

Slice Header values parameter set ID (merging method 0, syntax category C.a)

reference picture set (merging method 0,1, syntax category B)

Usage of implicit CTU address signaling cp. (referenced by a European Patent Application number: EP 18153516) (merging method 0, syntax category A)

That is, for the first value of the merge identifier type, i.e., type 0, the syntax elements (parameters) a motion constraint at tile and picture boundaries, the GOP structure, reference pictures sets, chroma format, base quantization parameter and chroma quantization parameter, bit depth luma/chroma, hypothetical reference decoder parameters including a parameter regarding initial arrival delay and a parameter initial removal delay, coding block structures, a transform minimum and/or maximum sizes, a pulse code modulation block usage, an advanced motion vector prediction, a sample adaptive offset, a temporal motion vector prediction, describes an intra smoothing, dependent slices, a sign hiding, a weighted prediction, transquant bypass, an entropy coding sync, a loop filter, a slice header value including a parameter set ID, a slice header value including a reference picture set, and a usage of implicit coding transform unit address signaling should be incorporated into the hash set.

For the second value of the merge identifier type, i.e., type 1, the syntax elements (parameters) a motion constraint at tile and picture boundaries, the GOP structure, chroma format, bit depth luma/chroma, coding block structures, a transform minimum and/or maximum sizes, a pulse code modulation block usage, an advanced motion vector prediction, a sample adaptive offset, a temporal motion vector prediction, an intra smoothing, a sign hiding, transquant bypass, an entropy coding sync, a loop filter, and a slice header value including a reference picture set.

For the third value of the merge identifier type, i.e., type 2, the syntax elements (parameters) a motion constraint at tile and picture boundaries, the GOP structure, chroma format, bit depth luma/chroma, an advanced motion vector prediction, a sample adaptive offset, a temporal motion vector prediction, a loop filter.

FIGS. 4a to 4d shows a schematic diagram illustrating an example of encoding parameters according to embodiments of the present application. In FIGS. 4a to 4d, reference sign 40 represents type 0 and the syntax elements belonging to type 0 are indicated by a dotted line. Reference sign 42 represents type 1 and the syntax elements belonging to type 1 are indicated by a normal line. Reference sign 44 represents type 2 and the syntax elements belonging to type 1 are indicated by a dashed line.

FIGS. 5a and 5b are an example of the sequence parameter set (SPS) 20 and the syntax elements which are required for type 0 are indicated by the reference sign 40. In the same manner, the syntax elements which are required for type 1 are indicated by the reference sign 42 and the syntax elements which are required for type 2 are indicated by the reference sign 44.

FIGS. 6a and 6b are an example of the picture parameter set (PPS) 22 and the syntax elements which are required for type 0 are indicated by the reference sign 40, as well as the syntax elements which are required for type 1 are indicated by the reference sign 42.

FIGS. 7a to 7d are an example of the slice header 30 and only one syntax element of the slice header is used to type 0 as indicated by the reference sign 40 in FIG. 7c.

FIG. 8 is an example of the structure of pictures (SOP) 26a and all syntax elements belong to the SOP is required for type 2.

FIG. 9 is an example of the motion constrained tile sets (MCTS) 26b and all syntax elements belong to the MCTS is required for type 2.

As mentioned above, the merge identifier 6a of FIG. 3 generates the merge identifier value using a hash function at hashing member 16a as well as hashing member 16b. In case the two or more merge identifier values are generated using a hash function, the hashes are connected in the sense that the input to the hash function of a second merge identifier which encompasses additional elements in the hash set with respect to a first merge identifier uses the first merge identifier value (hash result) instead of the respective syntax element values for concatenation of the input to the hash function.

In addition, presence of the merge identifier also provides a guarantee that the syntax elements incorporated into the hash set have the same value in all access units (AUs) of the coded video sequence (CVS) and/or bitstream. Furthermore, the guarantee has the form of a constraint flag in the profile/level syntax of the parameter sets.

The merging process is describing as below considering another embodiment according to the present invention using the FIGS. 10 to 13.

Figure 10:
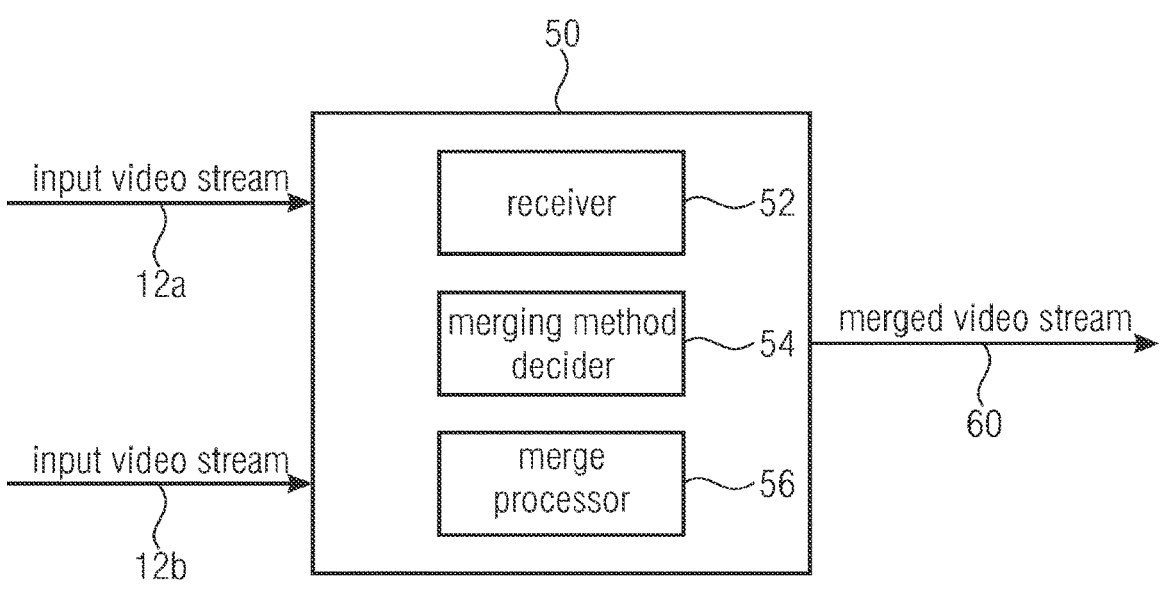
FIG. 10 shows a block diagram of an apparatus for providing a merged video representation as an example of a video merger where a bitstream merging concept according to embodiments of the present application could be implemented.

FIG. 10 shows a video merger for providing a merged video stream on the basis of a plurality of encoded video representation. The video merger 50 includes a receiver 52 where input video streams 12 (12a and 12b, indicated in FIG. 12) are received, a merging method identifier 54 and a merge processor 56. Merged video stream 60 is transmitted to a decoder. In case, the video merger 50 is included in a decoder, the merged video stream is transmitted to user equipment or any other apparatus to display the merged video stream.

Figure 12:
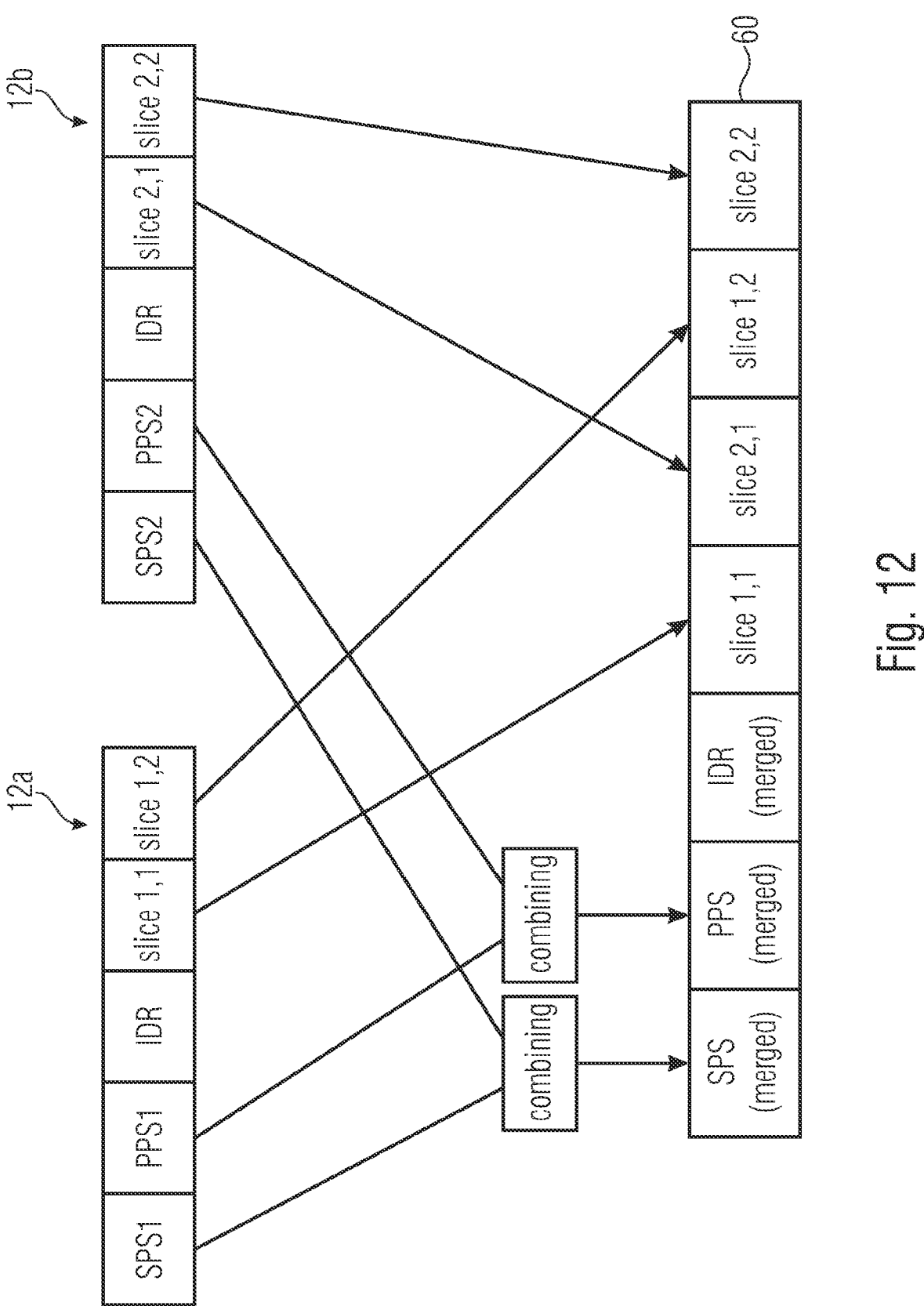
FIG. 12 shows a schematic diagram illustrating a bitstream structure of a plurality of video representations to be merged and a bitstream structure of merged video representation according to a bitstream merging concept of the present application.

The merging process is driven by the above described merge identifier and merge identifier type. The merging process can either entail only generation of parameter sets plus interleaving of NAL units, which is the most lightweight form of merging an associated with the merge identifier type value 0, i.e., the first complexity. FIG. 12 shows an example of the first complexity merging method. As indicated in FIG. 12, parameter sets, i.e., SPS1 of the video stream 12a and SPS2 of the video stream 12b are merged (merged SPS is generated based on SPS1 and SPS2), and PPS1 of the video stream 12a and PPS2 of the video stream 12b are merged (merged PPS is generated based on PPS1 and PPS2). IDR is optional data and therefore, explanation is omitted. In addition, slices 1,1 and 1,2 of the video stream 12a and slices 2,1 and 2,2 of the video stream 12b are interleaved as illustrated as merged video stream 60. In FIG. 10 and FIG. 12, two video stream 12a and 12b are input as an example. However, more video streams may also be input and merged in the same manner.

When required, the merging process can also include rewriting of slice headers in the bitstream during NAL unit interleaving which is associated with the merge identifier type value 1, i.e., the second complexity. Further and last, there are cases where syntax elements in the slice payloads are required to be adjusted which is associated with the merge identifier type value 2, i.e., the third complexity and requires entropy decoding and encoding during the NAL unit interleaving. The merge identifier and merge identifier type drive the decision of selecting one of the merging processes to be carried out and the details thereof.

Input to the merging process is a list of input sub-bitstreams that also represents the spatial arrangement. Output to the process is a merged bitstream. In general, in all bitstream merging processes, parameter sets for the new output bitstream need to be generated, which can be based on parameter sets of the input sub-bitstreams, for instance, the first input sub-bitstream. Used updates to the parameter set include the picture size. For example, the picture size of the output bitstream is calculated as the sum of the picture sizes of the input sub-bitstream in the respective dimensions and in context of their spatial arrangement.

It is a requirement of the bitstream merging process that all input sub-bitstreams carry the same values of at least one instance of merge identifier and merge identifier type. In one embodiment, the merging processes associated with the lowest value of merge identifier type for which all sub-bitstreams carry the same value of the merge identifier is carried out.

Figure 11:
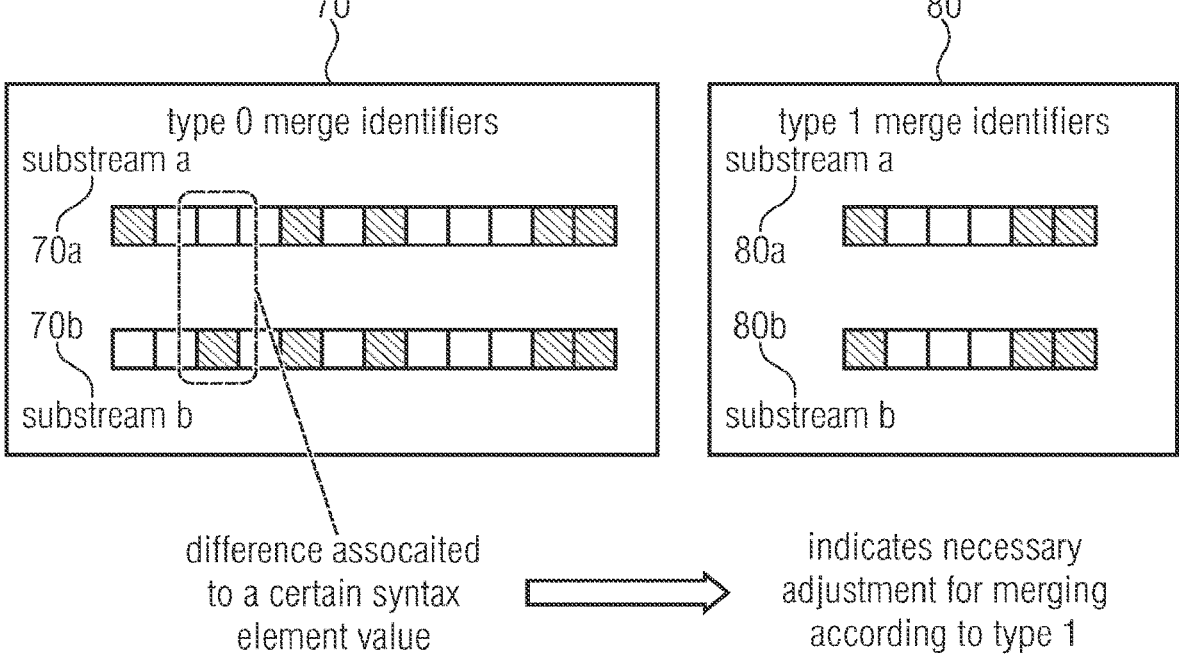
FIG. 11 shows a schematic diagram illustrating a determination process of a merging complexity according to embodiments of the present application.

For example, differences in a merge identifier value with a certain merge identifier type value are used in the merging process to determine details of the merging process according to a difference value of merge identifier type for which the merge identifier values match. For instance, as illustrated in FIG. 11, when a first merge identifier 70 with merge identifier type value equal to 0 does not match between two input sub-bitstreams 70a and but a second merge identifier 80 with merge identifier type value equal to 1 does match between the two sub-bitstreams 80a and 80b, the bit positions of the first merge identifier differences indicate the (slice header related) syntax elements that require adjustments in all slices.

Figure 13:
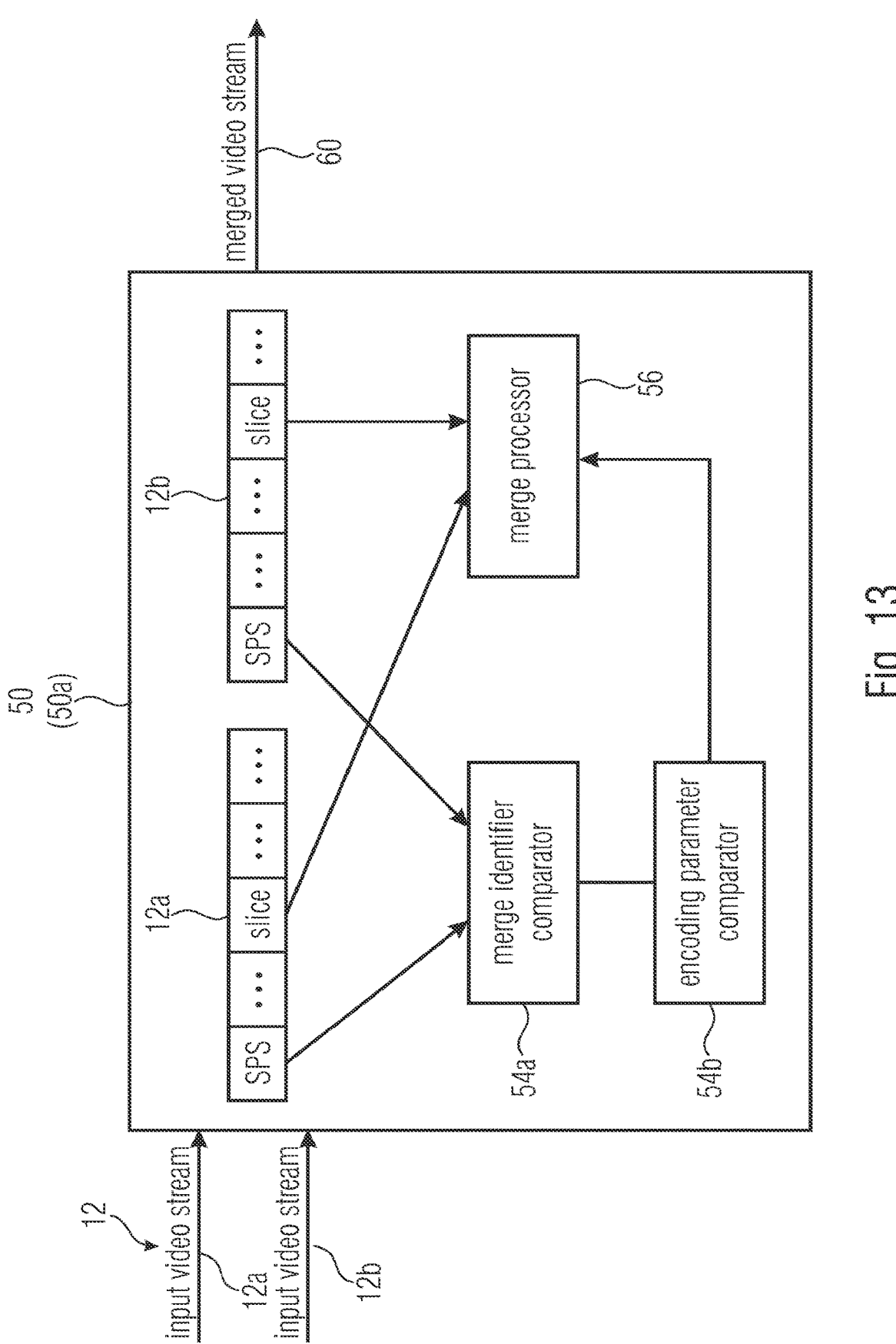
FIG. 13 shows a block diagram of an apparatus for providing a merged video representation as another example of a video merger where a bitstream merging concept according to embodiments of the present application could be implemented.

FIG. 13 shows a video merger 50 (50a) comprising a receiver (not shown), a merging method identifier comprises a merge identifier comparator 54a and an encoding parameter comparator 54b, and a merge processor 56. In case input video streams 12 include hash value as a merge identifier value, the value of each input video streams are compared at the merge identifier comparator 54a. For example, when both input video streams have the same merge identifier value, individual encoding parameters of each input video streams are compared at the encoding parameter comparator 54b. Based on the encoding parameter comparison result, the merging method is decided and the merge processor 56 merges the input video streams 12 by using the decided merging method. In case the merge identifier value (hash value) also indicates the merging method, individual encoding parameter comparison is not required.

In the above, three merging method, a first complexity, a second complexity and a third complexity merging method are explained. A fourth merging method is a merging of video streams using a full pixel decoding and pixel re-encoding. The fourth merging method is applied, in case all three merging method is not applicable.

The process for identifying the merge result level is describing as below considering another embodiment according to the present invention using the FIGS. 14 and 15. The identification of merge result level means to put information in a sub-bitstream and as to how big the contribution of the sub-bitstream to the level limits of a merged bitstream incorporating the sub-bitstream is.

Figure 14:
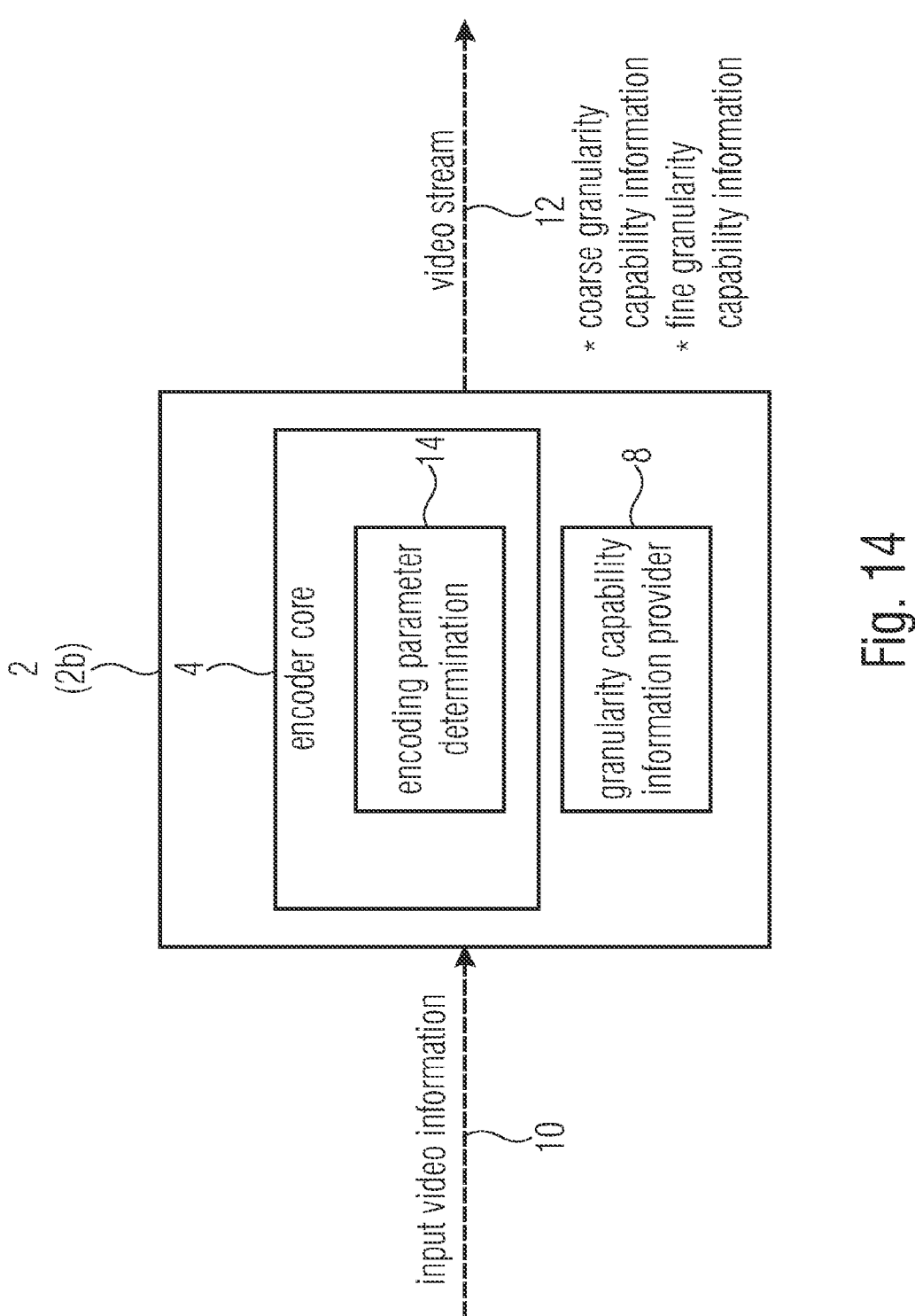
FIG. 14 shows a block diagram of an apparatus for providing an encoded video representation as an example of a video encoder which provides merged video representation capability demand information according to embodiments of the present application could be implemented.

FIG. 14 shows an encoder 2 (2b) comprising encoder core including an encoding parameter determination 14, merge identifier provision (not shown), and a granularity capability provider 8.

In general, when sub-bitstreams are to be merged into a joint bitstream, an indication as to how individual sub-bitstreams contribute to the level-specific limits of a codec system that a potential merged bitstream has to adhere to is vital to ensure creation of a legal joint bitstream. While traditionally, the codec level granularity is rather coarse, e.g. differentiating dominant resolutions such as 720p, 1080p or 4K, the merge level limit indication requires a much finer granularity. The granularity of this traditional level indication is insufficient to express the individual sub-bitstream contribution to a merged bitstream. Given, that the number of tiles to be merged is unknown beforehand, a reasonable tradeoff in flexibility and bitrate cost need to be found, but it is exceeding the traditional level limit granularity by far in general. One exemplary use case is 360-degree video streaming where a service provider requires freedom to choose between different tiling structures such as 12, 24 or 96 tiles per 360-degree video, wherein each tile stream would contribute $\frac{1}{12}$, $\frac{1}{24}$ or $/1;96$ of the overall level limit such as 8K assuming an equal rate distribution. Even further, assuming a non-uniform rate distribution amongst tiles, e.g., to achieve constant quality over the video plane, may require an arbitrarily fine granularity.

Such signaling, for instance, would be a signaled ratio and/or percentage of an additionally signaled level. For instance, in a conferencing scenario with four participants, each participant would send a legal level 3 bitstream that also includes the indication, i.e., level information included in the coarse granularity capability information, the indication stating that the send bitstream adheres to $\frac{1}{3}$ and/or 33% of level 5 limits, i.e., this information may be included in the fine granularity capability information. A receiver of multiple such streams, i.e., a video merger 50 (50b) as illustrated in FIG. 15, for instance, could hence know that three such bitstreams could be mergeable into a single joint bitstream adhering to level 5.

Figure 15:
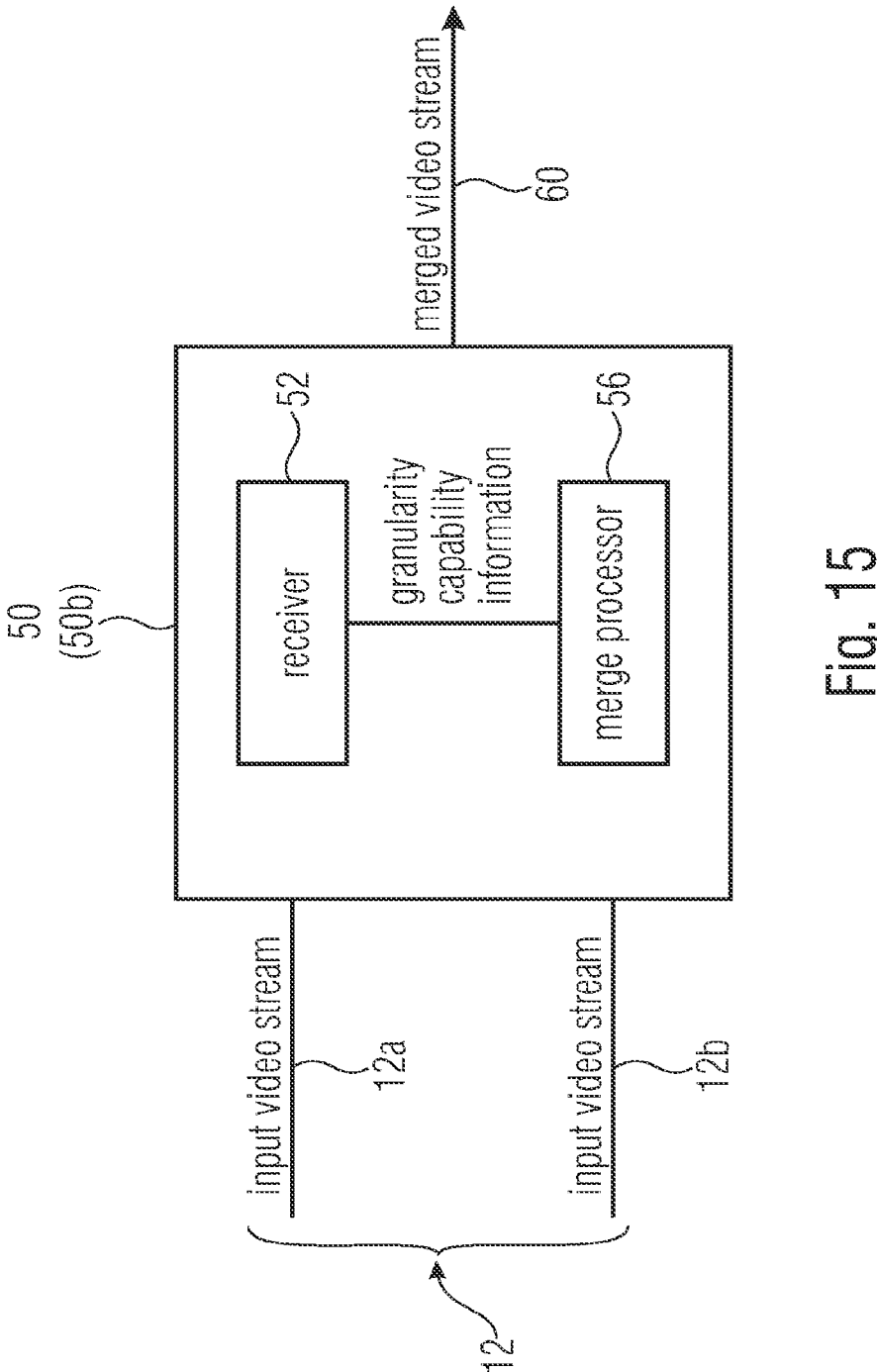
FIG. 15 shows a block diagram of an apparatus for providing a merged video representation as an example of a video merger which provides merged video representation capability demand information according to embodiments of the present application could be implemented.

In FIG. 15, the video merger is illustrated comprising a receiver 52 and a merge processer 56, and a plurality of video streams are input into the video merger. The video merger may be included in a video decoder or, it is not indicated in the figures, however, the receiver may work as a decoder. The decoder (not indicated in the figures) receives bitstream comprising a plurality of sub-bitstreams, a plurality of encoding parameters, the coarse and fine granularity capability information. The coarse and fine granularity capability information carried in SEI message, and the decoder parses the received information and translates the level and fraction into usable level limits of the decoder. Then, the decoder checks whether the bitstream it's encountering actually adheres to the limit expressed. The checked result is provided to the video merger or merge processor. Therefore, as already mentioned above, it is possible the video merger could know that a plurality of sub-bitstreams is mergeable into a single joint bitstream.

The granularity capability information may have the indication of ratio and/or percentage as a vector of values, each dimension concerning another aspect of the codec level limits, e.g., amount of maximum allowed luma samples per second, maximum image size, bitrate, buffer fullness, number of tiles or the like. In addition, the ratio and/or percentage refer to the general codec level of the video bitstream.

FIG. 16 shows a structure example of a supplement enhancement information (SEI) message syntax indicating level information.

As described in a recommendation ITU-T H.266, a syntax indicated by a reference sign 100 "sli_non_subpic_layers_fraction[i][k]" indicates the i-th fraction of the bitstream level limits associated with layers in targetCvss that have sps_num_subpics_minus1 equal to 0 when Htid is equal to k. When vps_max_layers_minus1 is equal to 0 or when no layer in the bitstream has sps_num_subpics_minus1 equal to 0, sli_non_subpic_layers_fraction[i][k] shall be equal to 0. When k is less than sli_max_sublayers_minus1 and sli_non_subpic_layers_fraction[i][k] is not present, it is inferred to be equal to sli_non_subpic_layers_fraction[i][k+1]. That is, the syntax 100 describes a level fraction with regard to an indicated level (sli_ref_level_idc) or with regard to the general level signaling in the parameter sets. This syntax applies only to layers without subpictures, i.e., for the whole picture plane.

A syntax indicated by a reference sign 102 in FIG. 16 "sli_ref_level_idc[i][k]" indicates the i-th level to which each subpicture sequence conforms as specified in Annex of a recommendation ITU-T H.266 when Htid is equal to k. Bitstreams shall not contain values of sli_ref_level_idc[i][k] other than those specified in Annex of a recommendation ITU-T H.266. Other values of sli_ref_level_idc[i][k] are reserved for future use by ITU-T|ISO/IEC. It is a requirement of bitstream conformance that the value of sli_ref_level_idc[0][k] shall be equal to the value of general_level_idc of the bitstream and that the value of sli_ref_level_idc[i][k] shall be less than or equal to sli_ref_level_idc[m][k] for any value of i greater than 0 and m greater than i. When k is less than sli_max_sublayers_minus1 and sli_ref_level_idc[i][k] is not present, it is inferred to be equal to sli_ref_level_idc[i][k+1]. This syntax describes the indicated level specifically for the fraction signalling.

Also as described in a recommendation ITU-T H.266, a syntax indicated by a reference sign 104 in FIG. 16 "sli_ref_level_fraction_minus1[i][j][k]" plus 1 specifies the i-th fraction of the level limits, associated with sli_ref_level_idc[i][k], for the subpictures with subpicture index equal to j in layers in targetCvss that have sps_num_subpics_minus1 greater than 0 when Htid is equal to k. When k is less than sli_max_sublayers_minus1 and sli_ref_level_fraction_minus1 [i][j][k] is not present, it is inferred to be equal to sli_ref_level_fraction_minus1[i][j][k+1]. This syntax is similar to the syntax 100 but applies to individual subpictures in layers with such subpictures.

In the following, additional embodiments and aspects of the invention will be described which can be used individually or in combination with any of the features and functionalities and details described herein.

A first aspect relates to a video encoder for providing an encoded video representation, wherein the video encoder is configured to provide a video stream comprising encoded parameter information describing a plurality of encoding parameters, encoded video content information and one or more merge identifiers indicating whether and/or how the encoded video representation can be merged with another encoded video representation.

In accordance with a second aspect when referring back to the first aspect, in the video encoder, using which complexity is determined based on a parameter value defined by the parameter information.

In accordance with a third aspect when referring back to the first or second aspect, in the video encoder, the merge identifier is concatenation of a plurality of encoding parameters.

In accordance with a fourth aspect when referring back to any of the first to third aspects, in the video encoder, the merge identifier is a hash value of a concatenation of a plurality of encoding parameters.

In accordance with a fifth aspect when referring back to any of the first to fourth aspects, in the video encoder, the merge identifier indicates a merge identifier type representing a complexity of a merging procedure.

In accordance with a sixth aspect when referring back to the fifth aspect, in the video encoder, a value of the merge identifier type indicates a merging process, wherein the video encoder is configured to switch between at least two of the following values of the merge identifier type; a first value of the merge identifier type which represents a merging process through parameter set rewriting, a second value of the merge identifier type which represents a merging process through parameter sets and slice header rewriting, and a third value of the merge identifier type which represents a merging process through parameter sets, slice header, and slice payload rewriting.

In accordance with a seventh aspect when referring back to any of the first to sixth aspects, in the video encoder, a plurality of merge identifiers is associated with different complexity of merging procedures.

In accordance with an eighth aspect when referring back to any of the first to seventh aspects, the encoder is configured to check whether the encoding parameters which are evaluated for a provision of the merge identifier are identical in all units of a video sequence, and to provide the merge identifier in dependence on the check.

In accordance with a ninth aspect when referring back to any of the first to eighth aspects, in the video encoder, the plurality of encoding parameters include merging-relevant parameters which are to be identical in different video streams to allow for a merging having less complexity than merging by a full pixel decoding, and the video encoder is configured to provide the one or more merge identifiers on the basis of the merging-relevant parameters.

In accordance with a tenth aspect when referring back to the ninth aspect, in the video encoder, the merging-relevant parameters include one or more or all out of the following parameters: a parameter describing a motion constraint at a tile boundary, information regarding a group of picture (GOP) structure, a parameter which describes a chroma coding format and a parameter which describes a luma coding format, a parameter which describes an advanced motion vector prediction, a parameter which describes a sample adaptive offset, a parameter which describes a temporal motion vector prediction, and a parameter which describes loop filter.

In accordance with an eleventh aspect when referring back to any of the first to seventh aspects, in the video encoder, a merge identifier associated with a first complexity of a merging procedure is determined on the basis of a first set of encoding parameters, when a merge parameter associated with a second complexity of a merging procedure, which is higher than the first complexity, is determined on the basis of a second set of encoding parameters, which is a true subset of the first set of encoding parameters.

In accordance with a twelfth aspect when referring back to the eleventh aspect, in the video encoder, a merge identifier associated with a third complexity of a merging procedure, which is higher than the second complexity, is determined on the basis of a third set of encoding parameters, which is a true subset of the second set of encoding parameters.

In accordance with a thirteenth aspect when referring back to the eleventh or twelfth aspect, the video encoder is configured to determine the merge identifier associated with the first complexity of the merging procedure on the basis of a set of encoding parameters which are to be equal in two different video streams to allow for a merging of the video streams which only modifies parameter sets which are applicable to a plurality of slices while leaving slice headers and slice payload unchanged.

In accordance with a fourteenth aspect when referring back to the eleventh or twelfth aspect, the video encoder is configured to determine the merge identifier associated with the first complexity one or more or all of the following parameters:

a parameter which indicates a motion constraint at tile and picture boundaries, a parameter which defines the GOP structure, a parameter which describes reference pictures sets, a parameter which describes chroma format, a parameter which describes base quantization parameter and chroma quantization parameter, a parameter which describes bit depth luma/chroma, a parameter which describes hypothetical reference decoder parameters including a parameter regarding initial arrival delay and a parameter initial removal delay, a parameter which describes coding block structures, a parameter which describes a transform minimum and/or maximum sizes, a parameter which describes a pulse code modulation block usage, a parameter which describes an advanced motion vector prediction, a parameter which describes a sample adaptive offset, a parameter which describes a temporal motion vector prediction, a parameter which describes an intra smoothing, a parameter which describes dependent slices, a parameter which describes a sign hiding, a parameter which describes a weighted prediction, a parameter which describes transquant bypass, a parameter which describes an entropy coding sync, a parameter which describes a loop filter, a parameter which describes a slice header value including a parameter set ID, a parameter which describes a slice header value including a reference picture set, and a parameter which describes a usage of implicit coding transform unit address signaling.

In accordance with a fifteenth aspect when referring back to any of the eleventh to fourteenth aspects, the video encoder is configured to determine the merge identifier associated with the second complexity of the merging procedure on the basis of a set of encoding parameters which are to be equal in two different video streams to allow for a merging of the video streams which modifies parameter sets which are applicable to a plurality of slices and which also modifies slice headers while leaving slice payload unchanged.

In accordance with a sixteenth aspect when referring back to any of the eleventh to fifteenth aspects, the video encoder is configured to determine the merge identifier associated with the second complexity one or more or all of the following parameters:

a parameter which indicates a motion constraint at tile and picture boundaries, a parameter which defines the GOP structure, a parameter which describes chroma format, a parameter which describes bit depth luma/chroma, a parameter which describes coding block structures, a parameter which describes a transform minimum and/or maximum sizes, a parameter which describes a pulse code modulation block usage, a parameter which describes an advanced motion vector prediction, a parameter which describes a sample adaptive offset, a parameter which describes a temporal motion vector prediction, a parameter which describes an intra smoothing, a parameter which describes a sign hiding, a parameter which describes transquant bypass, a parameter which describes an entropy coding sync, a parameter which describes a loop filter, and a parameter which describes a slice header value including a reference picture set.

In accordance with a seventeenth aspect when referring back to any of the eleventh to sixteenth aspects, the video encoder is configured to determine the merge identifier associated with the third complexity of the merging procedure on the basis of a set of encoding parameters which are to be equal in two different video streams to allow for a merging of the video streams which modifies parameter sets which are applicable to a plurality of slices, and which also modifies slice headers and slice payload but which does not perform a full pixel decoding and pixel re-encoding.

In accordance with an eighteenth aspect when referring back to any of the eleventh to seventeenth aspects, the video encoder is configured to determine the merge identifier associated with the third complexity on the basis of one or more or all of the following parameters:

a parameter which indicates a motion constraint at tile and picture boundaries, a parameter which defines the GOP structure, a parameter which describes chroma format, a parameter which describes bit depth luma/chroma, a parameter which describes an advanced motion vector prediction, a parameter which describes a sample adaptive offset, a parameter which describes a temporal motion vector prediction, and a parameter which describes a loop filter.

In accordance with a nineteenth aspect when referring back to any of the first to eighteenth aspects, the video encoder is configured to apply a hash function to a concatenation of a second merge identifier, which is associated with a second complexity of a merging procedure, and one or more encoding parameters, which have not been considered in the determination of the second merge identifier, in order to obtain a first merge identifier which is associated with a first complexity of a merging procedure which is lower than the second complexity.

In accordance with a twentieth aspect when referring back to any of the first to nineteenth aspects, the video encoder is configured to apply a hash function to a concatenation of a third merge identifier, which is associated with a third complexity of a merging procedure, and one or more encoding parameters, which have not been considered in the determination of the third merge identifier, in order to obtain a second merge identifier which is associated with a second complexity of a merging procedure which is lower than the third complexity.

A twenty-first aspect relates to a video merger for providing a merged video representation on the basis of a plurality of encoded video representations, wherein the video merger is configured to receive a plurality of video streams comprising encoded parameter information describing a plurality of encoding parameters, encoded video content information and one or more merge identifiers indicating whether and/or how the encoded video representation can be merged with another encoded video representation; wherein the video merger is configured to decide about a usage of a merging method in dependence on the merge identifiers.

In accordance with a twenty-second aspect when referring back to the twenty-first aspect, the video merger is configured to select a merging method, out of a plurality of merging methods, in dependence on the merge identifiers.

In accordance with a twenty-third aspect when referring back to the twenty-second aspect, the video merger is configured to select between at least two of the following merging methods; a first merging method, which is a merging of the video streams which only modifies parameter sets which are applicable to a plurality of slices while leaving slice headers and slice payload unchanged; a second merging method, which is a merging of the video streams which modifies parameter sets which are applicable to a plurality of slices and which also modifies slice headers while leaving slice payload unchanged; and a third merging method, which is a merging of the video streams which modifies parameter sets which are applicable to a plurality of slices, and which also modifies slice headers and slice payload but which does not perform a full pixel decoding and pixel re-encoding in dependence on the one or more merge identifiers.

In accordance with a twenty-fourth aspect when referring back to the twenty-third aspect, the video merger is configured to selectively use a fourth merging method, which is a merging of video streams using a full pixel decoding and pixel re-encoding, in dependence on the one or more merge identifiers.

In accordance with a twenty-fifth aspect when referring back to any of the twenty-second to twenty-fourth aspects, the video merger is configured to compare merge identifiers of two or more video streams associated with the same given merge method to make a decision whether perform a merging using the given merge method in dependence on a result of the comparison.

In accordance with a twenty-sixth aspect when referring back to the twenty-fifth aspect, the video merger is configured to selectively perform a merging using the given merge method if the comparison indicates that the merge identifiers of the two or more video streams associated with the given merge method are equal.

In accordance with a twenty-seventh aspect when referring back to the twenty-fifth aspect, the video merger is configured to use a merging method having a higher complexity than the given merge method if the comparison indicates that the merge identifiers of the two or more video streams associated with the given merge method are different.

In accordance with a twenty-eighth aspect when referring back to the twenty-seventh aspect, the video merger is configured to selectively compare encoding parameters which are to be equal in two or more video streams to allow for a merging of the video streams using the given merge method if the comparison indicates that the merge identifiers of the two or more video streams associated with the given merge method are equal, and wherein the video merger is configured to selectively perform a merging using the given merge method if the comparison of said encoding parameters indicates that the encoding parameters are equal, and wherein the video merger is configured to perform a merging using a merge method having a higher complexity than the given merge method if the comparison of said encoding parameters indicates that the encoding parameters comprise a difference.

In accordance with a twenty-ninth aspect when referring back to any of the twenty-first to twenty-eighth aspects, the video merger is configured to compare merge identifiers associated with merging methods having different complexities, and wherein the video merger is configured to merge the two or more video streams using a lowest complexity merge method for which associated merge identifiers are equal in the two or more video streams to be merged.

In accordance with a thirtieth aspect when referring back to any of the twenty-second to twenty-ninth aspects, the video merger is configured to compare merge identifiers associated with merging methods having different complexities, and wherein the video merger is configured to identify a lowest complexity merging method for which associated merge identifiers are equal in the two or more video streams to be merged; and wherein the video merger is configured to compare a set of encoding parameters, which are to be equal in the two or more video streams to be merged to allow for a merging using identified merging method, and wherein the video merger is configured to merge the two or more video streams using the identified merging method if the comparison indicates that the encoding parameters of the set of encoding parameters associated with the identified merging method are equal in the video streams to be merged.

In accordance with a thirty-first aspect when referring back to any of the twenty-second to thirtieth aspects, the video merger is configured to determine which encoding parameters should be modified in a merging process in dependence on one or more differences between merge identifiers of different video streams to be merged.

In accordance with a thirty-second aspect when referring back to the thirty-first aspect, the video merger is configured to determine which encoding parameters should be modified in a merging method having a given complexity in dependence on one or more differences between merge identifiers, associated with a merging method having a lower complexity than the given complexity, of different video streams to be merged.

In accordance with a thirty-third aspect when referring back to any of the twenty-first to thirty-second aspects, the video merger is configured to obtain joint encoding parameters, which are associated with slices of all the video streams to be merged, on the basis of encoding parameters of the video streams to be merged, and to include the joint encoding parameters into the merged video stream.

In accordance with a thirty-fourth aspect when referring back to the thirty-third aspect, the video merger is configured to adapt encoding parameters individually associated with individual video slices, in order to obtain modified slices to be included into the merged video stream.

In accordance with a thirty-fifth aspect when referring back to the thirty-fourth aspect, in the video merger, the adapted encoding parameters include a parameter representing a picture size of the merged encoded video representation, wherein the picture size is calculated based on the picture size of the encoded video representations to be merged.

A thirty-sixth aspect relates to a method for providing an encoded video representation, comprising providing a video stream comprising encoded parameter information describing a plurality of encoding parameters, encoded video content information and one or more merge identifiers indicating whether and/or how the encoded video representation can be merged with another encoded video representation.

A thirty-seventh aspect relates to a method for providing a merged video representation on the basis of a plurality of encoded video representations, comprising receiving a plurality of video streams comprising encoded parameter information describing a plurality of encoding parameters, encoded video content information and one or more merge identifiers indicating whether and/or how the encoded video representation can be merged with another encoded video representation; and selecting a merging method, out of a plurality of merging methods, in dependence on the merge identifiers.

A thirty-eighth aspect relates to a merge method for merging two or more video streams, comprising providing a common encoding parameter information on the basis of encoding parameter information of different video streams while leaving encoded video content information unchanged; select the merging procedure based on the unchanged encoded video content information; and merging two or more video streams using the selected merging procedure.

A thirty-ninth aspect relates to a computer program having a program code for performing, when running on computer, any of the methods according to the thirty-sixth to thirty-eighth aspects.

A fortieth aspect relates to a data stream generated by any of the methods according to the thirty-sixth to thirty-eighth aspects.

Although some aspects have been described in the context of an apparatus or a system, it is clear that these aspects also represent a description of the corresponding method, where a block or device corresponds to a method step or a feature of a method step. Analogously, aspects described in the context of a method step also represent a description of a corresponding block or item or feature of a corresponding apparatus and/or system. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A video encoder for providing an encoded video representation, the video encoder comprising:
at least one processor comprising processing circuitry configured to perform operations comprising:
providing, in a bitstream, a merge identifier indicating a method for merging two or more video streams;
providing, in the bitstream, a level information that indicates a compatibility of a video stream with a video decoder having a capability level out of a plurality of predetermined capability levels; and
providing, in the bitstream, a fractional level information that references one of the plurality of predetermined capability levels and indicates a fraction of the one of the plurality of predetermined capability levels, wherein the fraction of the one of the plurality of predetermined capability levels is specified as a ratio value,
wherein the merge identifier, the level information, and the fractional level information are useable by a video decoder to merge the two or more video streams.

2. The video encoder of claim 1, wherein the fractional level information indicates a fraction of an amount of maximum allowed luma samples per second.

3. The video encoder of claim 1, wherein the fractional level information indicates a fraction of a maximum image size.

4. The video encoder of claim 1, wherein the fractional level information indicates a fraction of a maximum bitrate.

5. The video encoder of claim 1, wherein the fractional level information indicates a fraction of a buffer fullness.

6. The video encoder of claim 1, wherein the fractional level information indicates a fraction of a maximum number of tiles.

7. A method of providing an encoded video representation comprising:
providing, in a bitstream, a merge identifier indicating a method for merging two or more video streams;
providing, in the bitstream, a level information that indicates a compatibility of a video stream with a video decoder having a capability level out of a plurality of predetermined capability levels; and
providing, in the bitstream, a fractional level information that references one of the plurality of predetermined capability levels and indicates a fraction of the one of the plurality of predetermined capability levels, wherein the fraction of the one of the plurality of predetermined capability levels is specified as a ratio value,
wherein the merge identifier, the level information, and the fractional level information are useable by a video decoder to merge the two or more video streams.

8. The method of claim 7, wherein the fractional level information indicates one or more of:
a fraction of an amount of maximum allowed luma samples per second;
a fraction of a maximum image size;
a fraction of a maximum bitrate;
a fraction of a buffer fullness; and/or a fraction of a maximum number of tiles.

9. A non-transitory storage medium having stored thereon a computer program for performing the method of providing an encoded video representation according to claim 7, when the computer program is run by a computer.

10. A video decoder for decoding a provided video representation, the video decoder comprising:
at least one processor comprising processing circuitry configured to perform operations comprising:
receiving, in a bitstream, a merge identifier indicating a method for merging two or more video streams;
receiving, in the bitstream, a level information that indicates a compatibility of a video stream with a capability level out of a plurality of predetermined capability levels;
receiving, in the bitstream, a fractional level information that references one of the plurality of predetermined capability levels and indicates a fraction of the one of the plurality of predetermined capability levels, wherein the fraction of the one of the plurality of predetermined capability levels is specified as a ratio value; and
merging the two or more video streams in accordance with the merge identifier, the level information, and the fractional level information.

11. The video decoder of claim 10, wherein the fractional level information indicates a fraction of an amount of maximum allowed luma samples per second.

12. The video decoder of claim 10, wherein the fractional level information indicates a fraction of a maximum image size.

13. The video decoder of claim 10, wherein the fractional level information indicates a fraction of a maximum bitrate.

14. The video decoder of claim 10, wherein the fractional level information indicates a fraction of a buffer fullness.

15. The video decoder of claim 10, wherein the fractional level information indicates a fraction of a maximum number of tiles.

16. A method of decoding a provided video representation comprising:
receiving, in a bitstream, a merge identifier indicating a method for merging two or more video streams;
receiving, in the bitstream, a level information that indicates a compatibility of a video stream with a capability level out of a plurality of predetermined capability levels;
receiving, in the bitstream, a fractional level information that references one of the plurality of predetermined capability levels and indicates a fraction of the one of the plurality of predetermined capability levels, wherein the fraction of the one of the plurality of predetermined capability levels is specified as a ratio value; and
merging the two or more video streams in accordance with the merge identifier, the level information, and the fractional level information.

17. The method of claim 16, wherein the fractional level information indicates one or more of:
a fraction of an amount of maximum allowed luma samples per second;
a fraction of a maximum image size;
a fraction of a maximum bitrate;
a fraction of a buffer fullness; and/or a fraction of a maximum number of tiles.

18. A non-transitory storage medium having stored thereon a computer program for performing a method of decoding a provided video representation according to claim 16, when the computer program is run by a computer.

19. The method of claim 16, wherein the merge identifier further comprises a concatenation of a plurality of parameters which must be equal in the two or more video streams to merge the two or more video streams.

20. The method of claim 16, wherein the merge identifier further comprises a hash of the concatenation of a plurality of parameters which must be equal in the two or more video streams to merge the two or more video streams.

* * * * *